(12) United States Patent
Saji

(10) Patent No.: US 9,492,876 B2
(45) Date of Patent: Nov. 15, 2016

(54) COUPLING DEVICE AND CUTTING TOOL

(71) Applicant: TUNGALOY CORPORATION, Iwaki-shi, Fukushima (JP)

(72) Inventor: Ryuichi Saji, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 8 days.

(21) Appl. No.: 14/402,047

(22) PCT Filed: May 28, 2013

(86) PCT No.: PCT/JP2013/064811
§ 371 (c)(1),
(2) Date: Nov. 18, 2014

(87) PCT Pub. No.: WO2013/180144
PCT Pub. Date: Dec. 5, 2013

(65) Prior Publication Data
US 2015/0147128 A1    May 28, 2015

(30) Foreign Application Priority Data

May 29, 2012 (JP) .................................. 2012-121444

(51) Int. Cl.
*B23B 51/00* (2006.01)
*B23B 31/107* (2006.01)

(52) U.S. Cl.
CPC ........... *B23B 51/00* (2013.01); *B23B 31/1077* (2013.01); *B23B 2251/02* (2013.01);
(Continued)

(58) Field of Classification Search
CPC ........... B23B 2251/02; B23B 2251/50; Y10T 403/7079; Y10T 403/7084; Y10T 403/7086; Y10T 403/7088; Y10T 408/9098
See application file for complete search history.

(56) References Cited

U.S. PATENT DOCUMENTS 1,994,791 A * 3/1935 Sanderson .............. E21B 17/04
279/43.3
2,259,611 A   3/1941 Burger
(Continued)

FOREIGN PATENT DOCUMENTS

JP    H05-41606      6/1993
JP    2007-83349     4/2007

OTHER PUBLICATIONS

International Search Report in PCT/JP2013/064811, dated Jul. 16, 2013.
(Continued)

*Primary Examiner* — Daniel Howell
*Assistant Examiner* — Chwen-Wei Su
(74) *Attorney, Agent, or Firm* — Womble Carlyle

(57) ABSTRACT

A coupling device couples a first member and a second member. The coupling device includes: two protruding portions provided on the first member; a through hole formed to pass through the second member; two reception holes provided in the second member and each formed to connect to the through hole; and a fixing member having a first pressing portion and a second pressing portion. The fixing member is configured to, when being disposed in the through hole, change a distance between the first pressing portion and the second pressing portion due to application of a force to one end portion of the fixing member. The first pressing portion and the second pressing portion are formed to exert a fixing force on either corresponding one of the two protruding portions received in the two reception holes.

30 Claims, 25 Drawing Sheets

(52) U.S. Cl.
CPC ....... *B23B2251/50* (2013.01); *Y10T 403/7075* (2015.01); *Y10T 403/7084* (2015.01); *Y10T 408/89* (2015.01); *Y10T 408/9098* (2015.01)

(56) References Cited

U.S. PATENT DOCUMENTS

| | | | | |
|---|---|---|---|---|
| 2,485,799 A | * | 10/1949 | Woytych | B23B 31/06 279/103 |
| 4,829,862 A | * | 5/1989 | Keritsis | B23B 31/1077 279/67 |
| 4,945,793 A | * | 8/1990 | von Haas | B23B 29/046 82/157 |
| 5,466,102 A | * | 11/1995 | Erickson | B23B 29/046 408/239 A |
| 5,788,400 A | * | 8/1998 | Wey | F16B 7/0413 24/589.1 |
| 6,415,696 B1 | | 7/2002 | Erickson et al. | |
| 6,543,318 B1 | * | 4/2003 | Erickson | B23B 29/046 409/234 |
| 6,739,791 B1 | | 5/2004 | Piana et al. | |
| 8,172,490 B2 | * | 5/2012 | Kretzschmann | B23B 31/06 279/67 |
| 2011/0097168 A1 | | 4/2011 | Jager et al. | |

OTHER PUBLICATIONS

International Preliminary Report on Patentability (IPRP) dated Dec. 2, 2014 issued in PCT counterpart application (No. PCT/JP2013/064811).

* cited by examiner

COUPLING DEVICE AND CUTTING TOOL

RELATED APPLICATIONS

This is a 371 US National Phase of International Patent Application No. PCT/JP2013/0564811 filed 2013 May 28, and published as WO2013/180144A1 on Dec. 5, 2013, which claims priority to JP 2012-121144, filed May 29, 2012. The contents of the aforementioned applications are incorporated by reference in their entirety.

TECHNICAL FIELD

The present invention relates to a coupling device for coupling two members to each other and, particularly to a cutting tool using the coupling device.

BACKGROUND ART

Conventionally, drills have been provided of a type in which a leading end member to which a cutting insert is removably mounted is removably fixed to a drill body. Patent literature 1 discloses an example of the above described drills. There is also provided a drill in which the leading end member that can be removably mounted to the drill body is configured as a throw-away tip. FIG. 1 illustrates one example of such drills. In the drill illustrated in FIG. 1, the throw-away tip including a pair of cutting edges is removably mounted to the drill body with two screws.

An advantageous effect of the drill (hereinafter, referred to as a "head-exchange type drill") of a type of exchanging such a leading end member is that, if the leading end member is exchanged to a leading end member in a different size, even when the body member is the same as that before the leading end member is exchanged, a hole having a different outer diameter can be processed. In other words, when one body member and a plurality of leading end members each corresponding to an outer diameter of the hole to be processed are prepared, holes in various types of sizes can be processed. Therefore, compared with a conventional drill in which a leading end portion and a body portion are integrated, such a head-exchange type drill can share the body member when a process is performed on the holes having the different diameters, thereby reducing a management cost. Further, when the leading end member of the drill of this type is for example worn out, or damaged, only the leading end member may be exchanged, thereby reducing a running cost and environmental load.

CITATION LIST

Patent Literature

PTL 1: Japanese Patent Laid-Open No. 2011-136415

SUMMARY OF INVENTION

Technical Problem

In the above described drill, as illustrated in FIG. 1, two screws are each inserted from a leading end member (head) side toward the body member, to fix the leading end member onto the body member. When such a fixing method is adopted, an operator needs to individually tighten the two screws, and tightening forces of the screws may largely differ from each other. If the forces of tightening the head largely differ depending on the screw, a bending stress is applied to the head, and thus lives of the head and the body member may be shortened. Further, an operation for individually operating the two screws should be improved in an operational efficiency. Such a problem often occurs for a drill having a comparatively small diameter and using the screws having a small diameter.

The present invention has an object to provide a coupling device for improving at least one of the above described problems.

Further, the present invention has an object to provide a coupling device having an excellent operability and capable of applying a preferable tightening force or fixing force to the member to be coupled.

Furthermore, the present invention has an object to provide a cutting tool to which such a coupling device is adopted.

According to an aspect of the present invention, a coupling device is provided for coupling a first member and a second member to each other, the coupling device including:

two protruding portions provided on the first member;

a through hole formed to pass through the second member;

two reception holes provided in the second member and each formed to connect to the through hole and to receive the protruding portion; and a fixing member including a first pressing portion and a second pressing portion wherein the fixing member is configured to, when being disposed in the through hole, be able to change a distance between the first pressing portion and the second pressing portion due to application of a force to one end portion of the fixing member, and the first pressing portion is formed to be able to exert a fixing force on one of the two protruding portions received in one of the two reception holes and the second pressing portion is formed to be able to exert a fixing force on the other of the two protruding portions received in the other of the two reception holes.

In the coupling device having such a configuration, when the fixing member is disposed in the through hole of the second member, due to application of the force to one end portion of the fixing member, the distance between the first pressing portion and the second pressing portion can be changed. With an operation for one end portion of the fixing member, the fixing force can be applied to the two protruding portions received in the two reception holes. Therefore, the two members can be coupled to each other with a simple operation. As described above, since one operation can couple the two members, when two members are coupled to each other, an excessive bending stress can be prevented from being generated.

Preferably, the two protruding portions are shaped to receive a drawing force from the fixing member, in a manner in which, when the fixing member is disposed in the through hole, the first pressing portion presses one of the two protruding portions and the second pressing portion presses the other of the two protruding portions.

Preferably, the fixing member includes a first fixing element and a second fixing element having the second pressing portion; the first fixing element is configured to threadedly engaged with the second fixing element; the second fixing element has a rotation prevention portion; and the second member includes, when the fixing member is disposed in the through hole, a portion cooperating with the rotation prevention portion of the second fixing element to prevent the second fixing element from rotating due to rotation of the first fixing element. The first fixing element can have the first pressing portion that is integrated into the first fixing element. Alternatively, the fixing member further can include a third fixing element to be threadedly engaged with the first fixing element; and, in this case, the third fixing element can have the first pressing portion that is integrated into the third fixing element.

Preferably, when the fixing member is disposed in the through hole of the second member, the first pressing portion and the second pressing portion may be selectively positioned in a first released state where the protruding portion of the first member can be inserted into the reception hole and removed from the reception hole or in a second fixed state where a fixing force is applied to the protruding portion. The fixing member can be configured such that the first pressing portion is opposed to the second pressing portion; and, in this case, a distance between the first pressing portion and the second pressing portion in the first released state is longer than a distance between the first pressing portion and the second pressing portion in the second fixed state. Alternatively, the fixing member can be configured such that the first pressing portion and the second pressing portion face in opposite directions, and, in this case, a distance between the first pressing portion and the second pressing portion in the first released state is shorter than a distance between the first pressing portion and the second pressing portion in the second fixed state. For example, each of the first pressing portion and the second pressing portion can have a tapered shape. In this case, each of the two protruding portions of the first member may have a recessed shape corresponding to the tapered shape of their pressing portions.

According to another aspect of the present invention, a cutting tool adopting the coupling device can be provided. In this case, for example, a first member is a tool leading end member, and a second member is a tool body, i.e., a body member. Alternatively, the first member can be the tool body, and the second member can be the tool leading end member. The first member can directly have a cutting edge. In addition, or alternatively, the first member may be removably mounted with a member with the cutting edge, and also the second member can be removably mounted with the member with the cutting edge.

DESCRIPTION OF EMBODIMENTS

With reference to the drawings, the embodiments according to the present invention will be described below.

First, with reference to FIGS. 2 to 12, a first embodiment according to the present invention will be described. A coupling device (i.e., coupling mechanism) of the first embodiment described below is adopted to couple a first member 10 with a second member 30. Herein, a completed product in which the first member 10 and the second member 30 are assembled with each other is referred to as an assembly.

Figure 1:
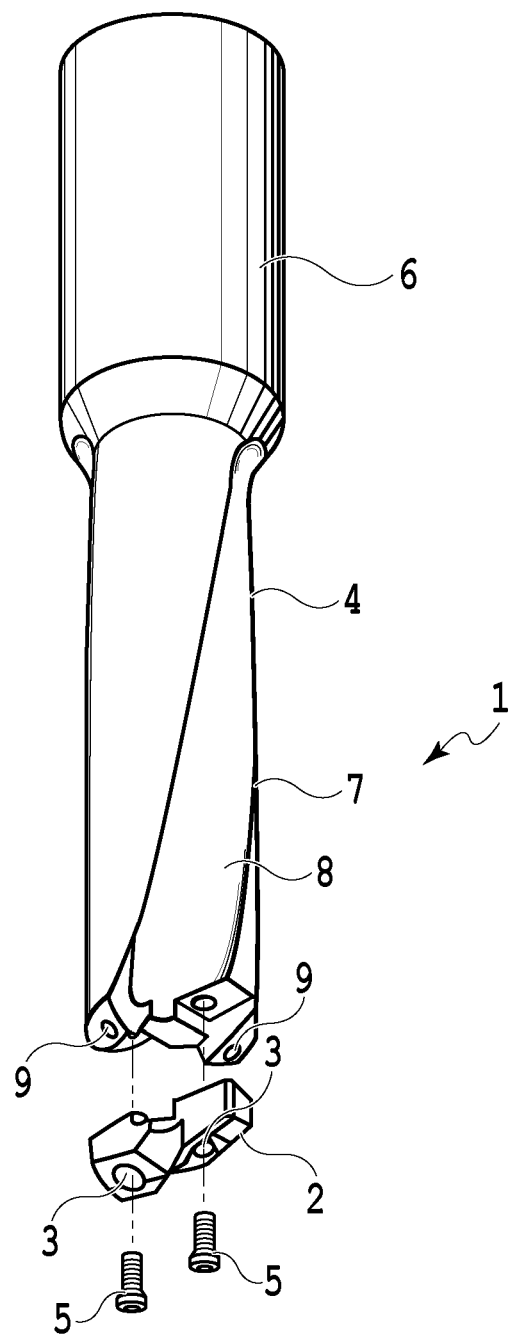
FIG. 1 is an exploded, perspective view of a conventional drill as an example.
Figure 2:
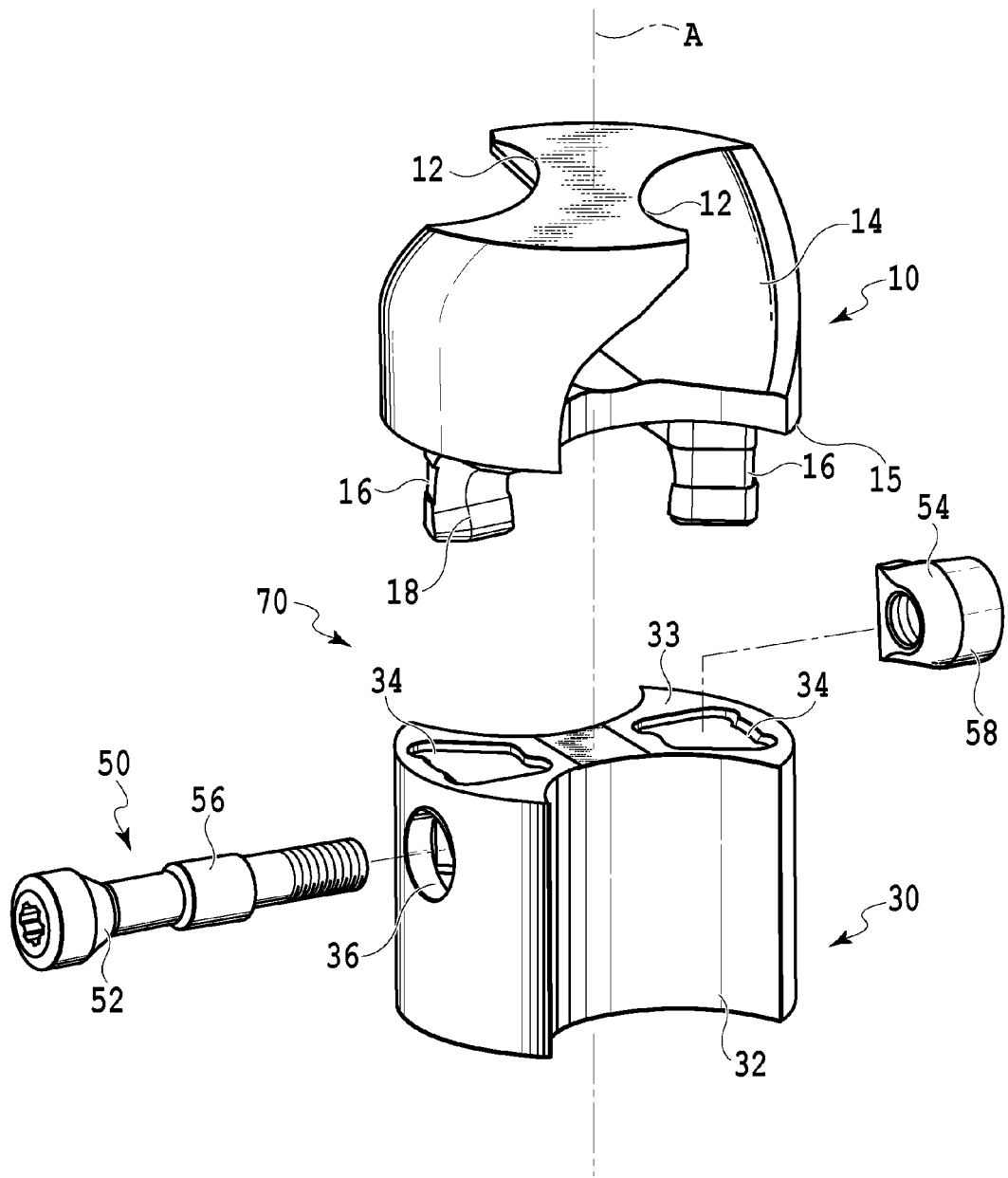
FIG. 2 is an exploded, perspective view of an assembly of a first embodiment according to the present invention.
Figure 3:
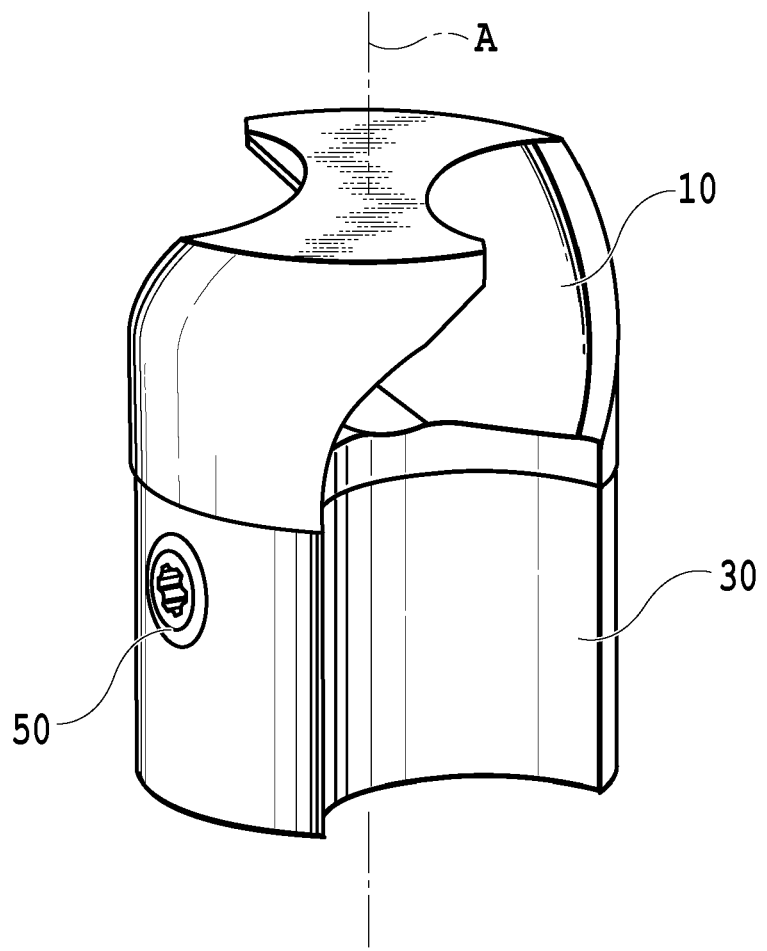
FIG. 3 is a perspective view of the assembly of the first embodiment.

The first member 10 is a member (model member) imitating a throw-away tip as a drill leading end member (tool leading end member), and directly includes a portion 12 imitating a cutting edge 3 of a throw-away tip 2 of a drill 1 or corresponding to the cutting edge 3 illustrated in FIG. 1. The first member 10 further includes a recessed portion 14 imitating a chip discharging groove. The first member 10 may be changed in a shape to be configured as the throw-away tip and, for example, the portion 12 can be changed to have a cutting edge shape.

The second member 30 is a member (model member) imitating a drill body as a tool body, particularly the leading end portion of the drill body, and may have a shape close to that of the drill body, or it may be the drill body itself. The second member 30 corresponds to a portion to which the throw-away tip 2 is mounted with a screw 5, of a drill body 4 illustrated in FIG. 1. The second member 30 includes a recessed portion 32 imitating the chip discharging groove. The second member 30, in a similar manner to the drill body illustrated in FIG. 1, can further have a configuration imitating a handle portion 6 and an elongated shank portion 7, and can furthermore have a configuration corresponding to the chip discharging groove 8 in a spiral shape or an oil hole 9. As clearly described below, the coupling device of the present embodiment does not use two screws unlike the drill 1 illustrated in FIG. 1.

Since the first member 10 and the second member 30 are members imitating each of the members of the drill, they have a rotational outline having a substantially columnar shape generated by a rotation about a center axis A. However, the first member 10 is not limited to such a shape, but may substantially have a shape such as a simple cylindrical shape or square columnar shape, and may not be used by being rotated about the axis. The same goes for the second member 30.

A coupling device 70 of the present embodiment is generally configured to, when the first member 10 is coupled to the second member 30, insert each of two protruding portions 16 of the first member 10 into each of two reception holes 34 formed in the second member 30, apply a force to one end portion of a fixing member 50 disposed in the through hole 36 of the second member 30 to move a first pressing portion 52 of the fixing member 50 and a second pressing portion 54 thereof, and thereby exert a force or a fixing force for fixing the first member 10 to the second member 30 to the protruding portion 16 of the first member 10 inserted into the reception hole 34.

The coupling device 70 adopted to couple the first member 10 to the second member 30 includes two protruding portions 16 provided on the first member 10, two reception holes 34 formed in the second member 30 to receive the protruding portions 16, the through hole 36 provided to pass through the second member 30, and the fixing member 50. The fixing member 50 consists of a first fixing element 56 and a second fixing element 58 that are coupled to each other in a screw style. The first fixing element 56 integrally has the first pressing portion 52 and the second fixing element 58 integrally has the second pressing portion 54.

Figure 5:
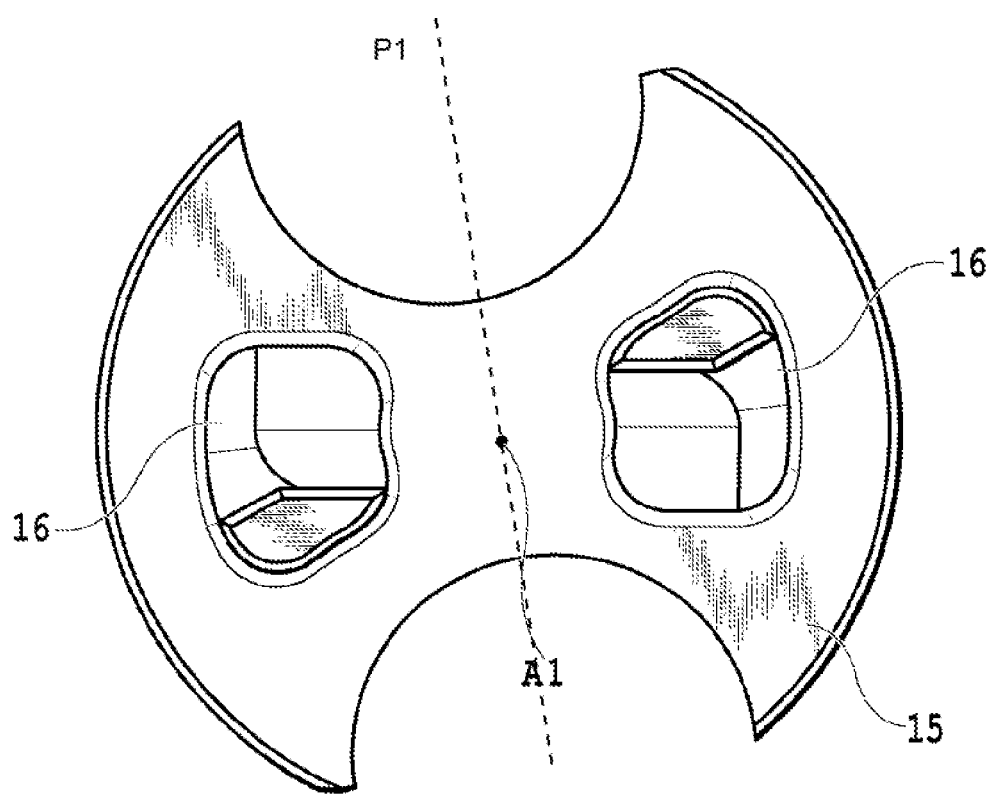
FIG. 5 is a bottom view of the part of the first member of the first embodiment.

The two protruding portions 16 extends from an end face (coupling face) 15 of the first member 10. The two protruding portions 16 are formed to have the same shape, and disposed in rotational symmetry of 180 degrees about an axis A1 of the first member 10 coinciding with an axis A of the assembly (refer to FIG. 5, for example). As seen in FIG. 5, the two protruding portions are across from one another on opposite sides of a longitudinal first plane P1 which contains the first member axis A1, each protruding portion being located entirely on one side of to the longitudinal first plane P1. Each of the protruding portions 16 substantially extends in a direction of the axis A1 of the first member 10. The end face 15 provided with the protruding portions 16 is configured to be a plane, but, it may have other unique shapes.

Figure 4:
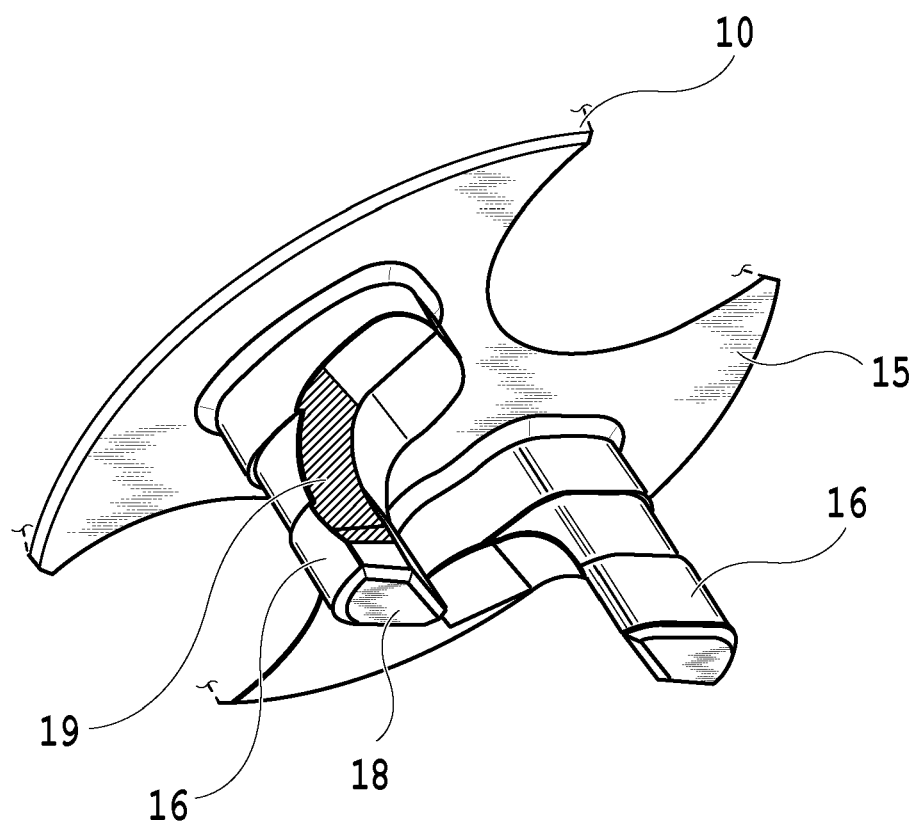
FIG. 4 is a perspective view of a part of a first member of the first embodiment.
Figure 6:
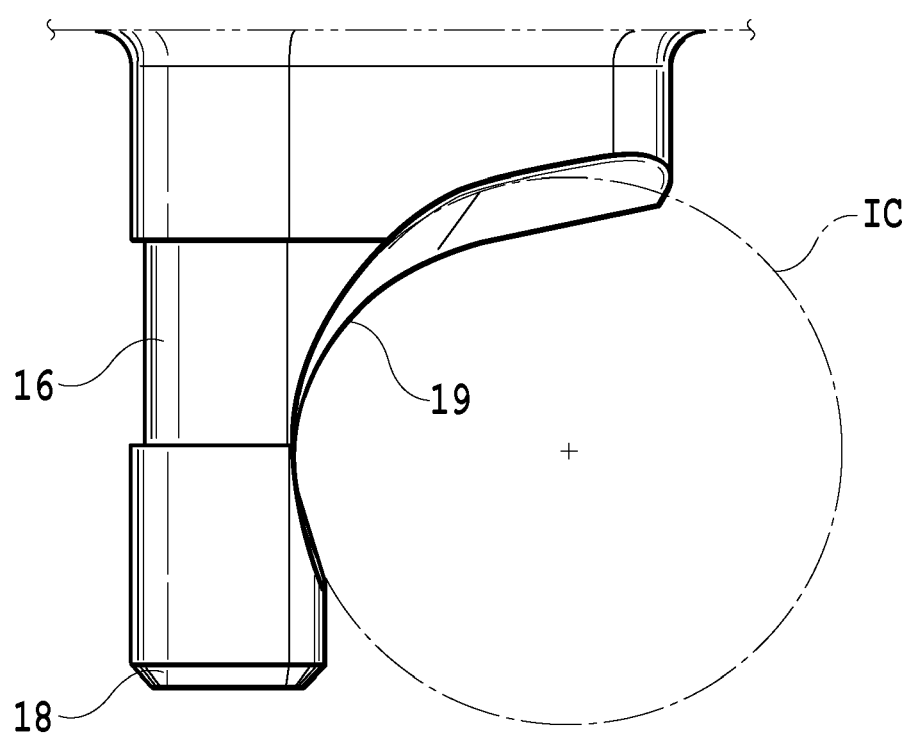
FIG. 6 is a side view of one protruding portion of the first member of the first embodiment.
Figure 7:
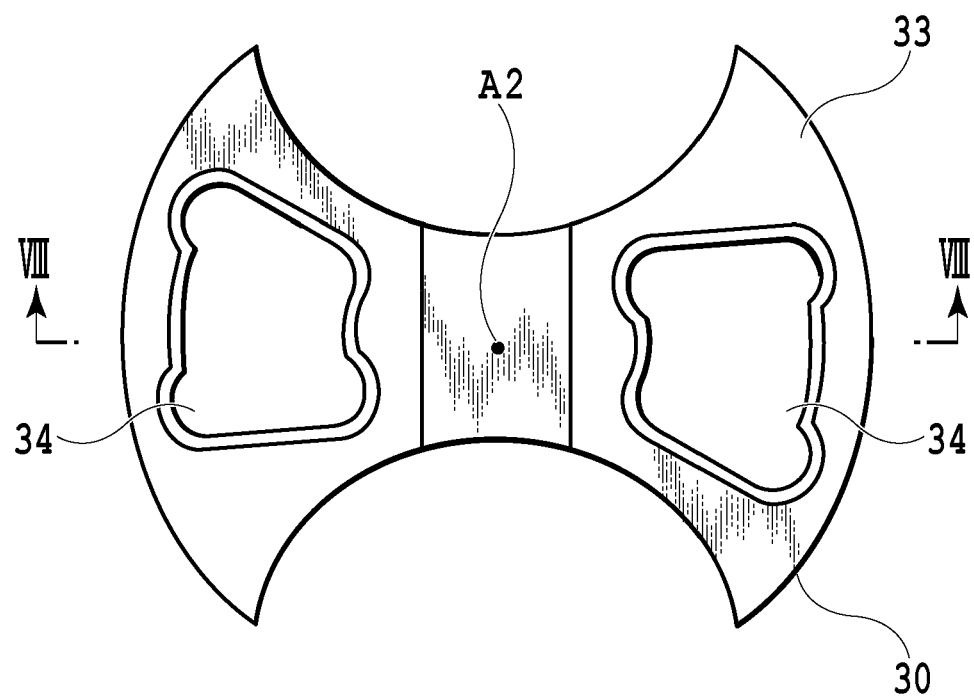
FIG. 7 is a plan view of a second member of the first embodiment.

The protruding portion 16 is formed to be thick at its leading end portion 18 (refer to FIG. 6). In the protruding portion 16, a face portion, i.e., an abuttable face is defined to abut on the fixing member 50 when the first member 10 is fixed to the second member 30, and the abuttable face extends from the leading end portion 18 to a base end portion, i.e., an end face 15 side. As illustrated in FIG. 4, an entire portion or a part of a shaded portion, i.e., a face portion 19 can configure the abuttable face. As illustrated in FIG. 6, a portion extending from a root side to the leading end side (including the face portion 19 illustrated in FIG. 4) of the protruding portion has a recessed shape. Particularly, the face portion 19 of the protruding portion 16 of the first member 10 has the recessed shape corresponding to a tapered shape of the pressing portions 52, 54 of the fixing member 50. The shape of the protruding portion 16 is defined such that the pressing portions 52, 54 of the fixing member 50 are firmly fit together or reliably engaged with each other, thereby improving the engagement with the fixing member 50. Particularly, of the face portion 19, a portion where its normal line includes a component oriented to a first member 10 side, i.e., an end face 15 side can function as a portion for receiving a drawing force described below (refer to FIG. 6). The drawing force includes a component in a direction from the first member to the second member in the axis A direction. In addition, since the protruding portion is configured as described above, when the first member 10 is coupled, i.e., fixed to the second member 30, a portion of the protruding portion 16 substantially positioned at an inner side of the hole 34 than the axis of the fixing member 50, i.e., the leading end portion 18 protrudes toward a lower side of the fixing member 50. Therefore, as clearly understood from FIGS. 4, 6, a leading end of the protruding portion 16 has a substantially L-like shape.

Figure 8:
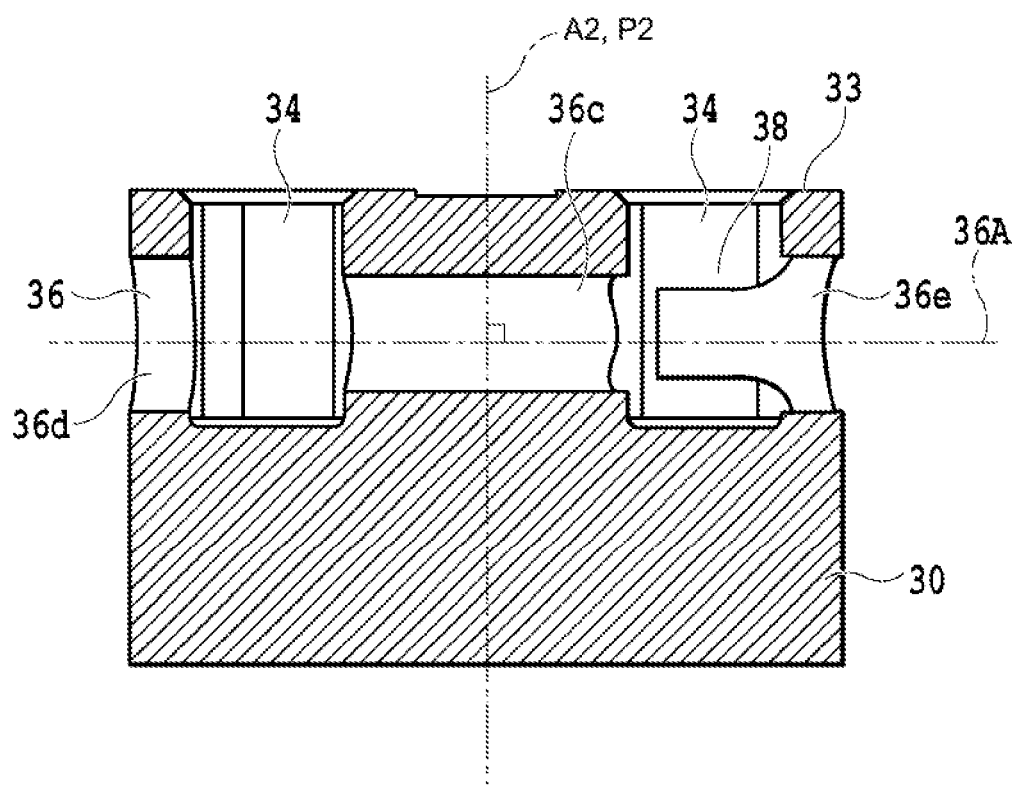
FIG. 8 is a cross-sectional view of the second member taken along the line of VIII-VIII illustrated in FIG. 7.
Figure 12:
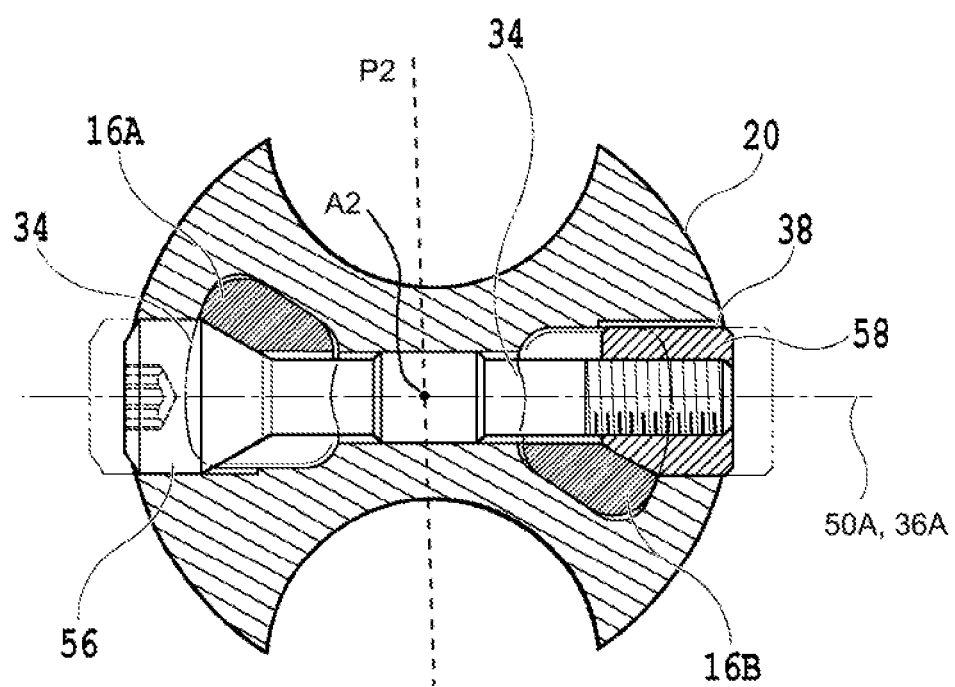
FIG. 12 illustrates a coupled portion of the coupled assembly illustrated in FIG. 3, and a partial cross-sectional view of a plane orthogonal to an axis of the assembly and including an axis of a through hole of the second member.
Figure 13:
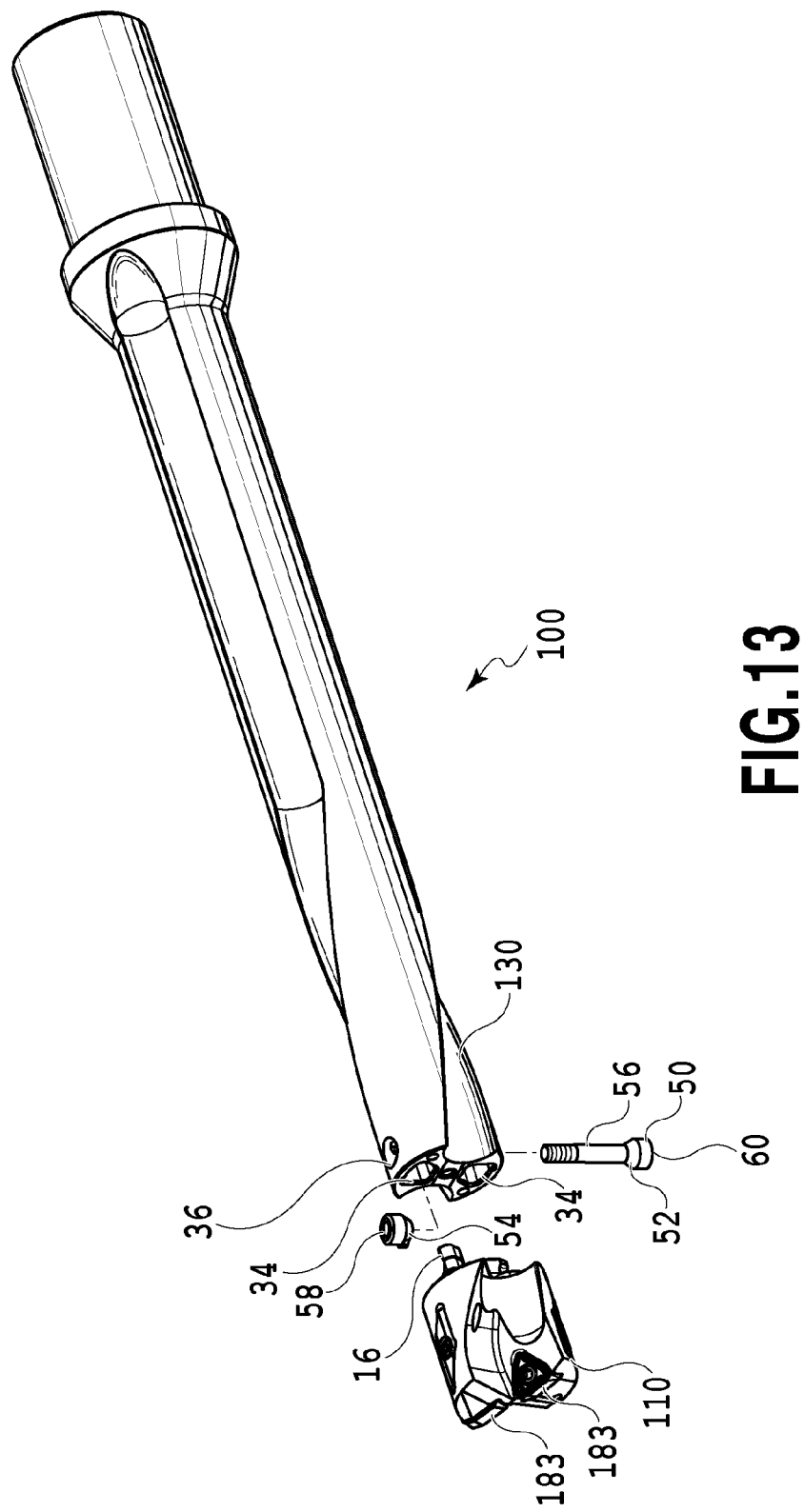
FIG. 13 is an exploded, perspective view of a cutting tool of a second embodiment according to the present invention.

In the second member 30, the two reception holes 34 are formed, which are each opened on the end face (coupling face) 33 of the second member 30. Each of the reception holes 34 is formed to receive one corresponding protruding portion 16 of the first member 10. Since the first member 10 includes the two protruding portions 16, the second member 30 includes the two reception holes 34. The two reception holes 34 have the same shape, and are disposed in the rotational symmetry of 180 degrees about the axis A2 of the second member 30 coinciding with the axis A of the assembly. As seen in FIGS. 8 and 12, the two reception holes 34 are across from one another on opposite sides of a second member longitudinal plane P2 which contains the second member axis A2. Each of the reception holes 34 substantially extends in a direction of the axis A2 of the second member 30. The end face 33 provided with the reception holes 34 is configured to be the plane, but, it may have another shape corresponding to the end face 15 of the first member 10.

The second member 30 includes the through hole 36 extending to pass through the second member 30. The through hole 36 extends straight, in which a straight axis 36A can be defined. In the present embodiment, the through hole 36 is formed to have the axis 36A extending on a plane orthogonal to the axis A2 of the second member 30. An outer shape or an outline of the through hole 36 on a cross-sectional surface orthogonal to the axis 36A of the through hole 36 varies depending on a cut portion. As illustrated in FIG. 8, the through hole 36 is formed thinner at its center portion, and thicker at both end portions 36d, 36e than the center portion 36c thereof. The through hole 36 is formed in a symmetrical shape about the axis A2 of the second member 30, and each of the both end portions 36d, 36e is formed such that the first pressing portion 52 or the second pressing portion 54 of the fixing member 50 can move in a direction of the axis 36A of the through hole 36. The center portion of the through hole 36 is formed such that the first pressing portion 52 and the second pressing portion 54 cannot enter and pass through the center portion. As seen in FIGS. 8 and 12, the two reception holes 34, the through hole's end portions 36d, 36e, and the pressing portions 52, 54 are on opposite sides of the second member longitudinal plane P2 which is both perpendicular to the through hole axis 36A and contains the second member axis A2. As best seen in FIG.

12, the pressing portions 52, 54 contact the protruding portions 16A, 16B on opposite sides of the second member longitudinal plane P2.

Since the through hole 36 is formed to be able to substantially house therein the fixing member 50 described below, it is also referred to as a lateral housing hole. The through hole 36 is connected to each of the two reception holes 34 in mid-course (refer to FIG. 8). When the protruding portion 16 of the first member 10 is received in the reception hole 34, the protruding portion 16 reaches an intersection region between the through hole 36 and the reception hole 34. Particularly, when the protruding portion 16 is inserted into the reception hole 34 until the end face 15 of the first member 10 and the end face 33 of the second member are confronted with each other, i.e., abutted on each other, the leading end portion 18 of the protruding portion 16 reaches a position (fixable position) that is substantially beyond the axis 36A of the through hole 36. At this point, of the face portion 19 of the protruding portion 16, a majority of portion where its normal line includes the component oriented to the end face 15 of the first member 10 is positioned away from the end face 33 of the second member 20 further than the axis 36A of the through hole 36. This enables, when the first member 10 is fixed to the second member 30, the drawing force from the fixing member 50 into the second member 30 to be transmitted to the first member 10 more preferably.

Herein, the fixing member 50 will be described. The fixing member 50 is configured such that the first fixing element 56 and the second fixing element 58 are threadedly engaged and connected with each other.

Figure 9:
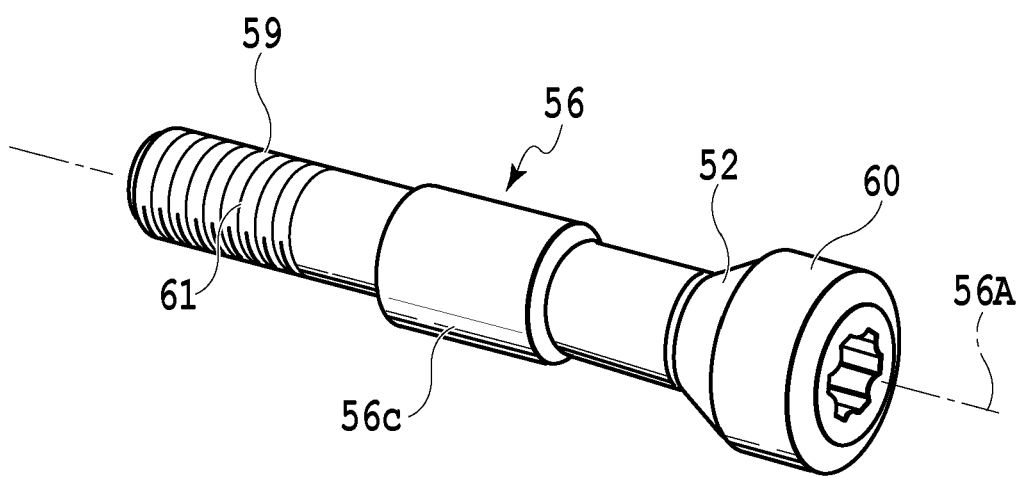
FIG. 9 is a perspective view of a first fixing element of the first embodiment.
Figure 10:
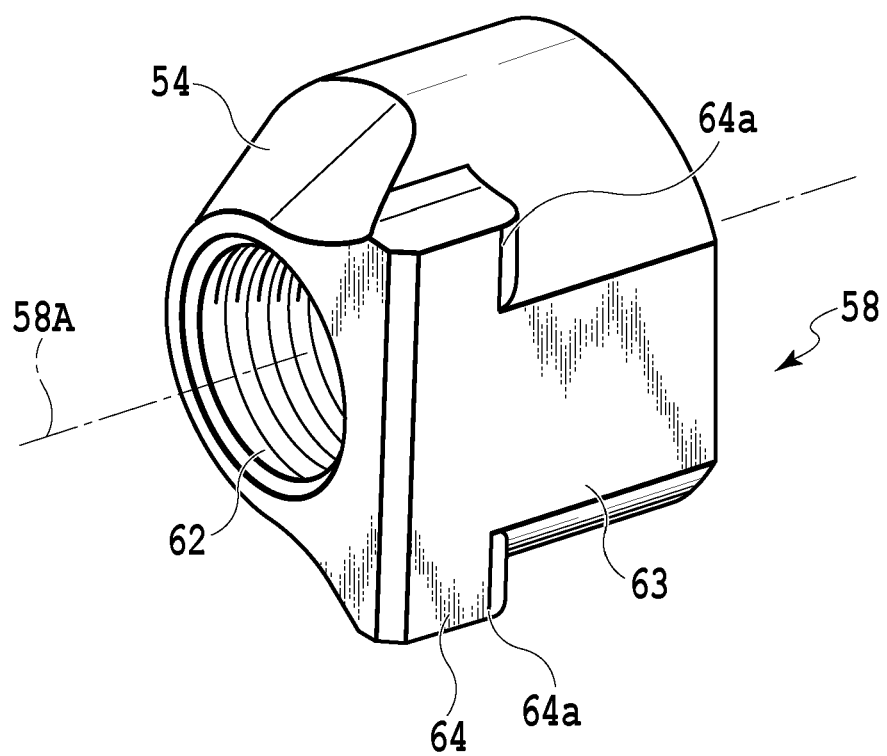
FIG. 10 is a perspective view of a second fixing element of the first embodiment.
Figure 11:
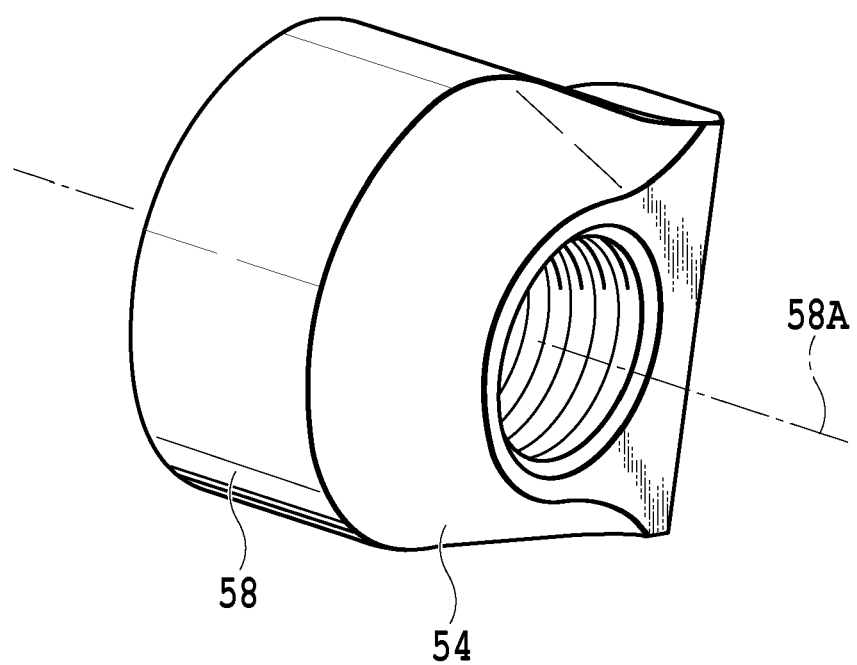
FIG. 11 is a perspective view of the second fixing element of the first embodiment in a different orientation from that in FIG. 10.

The first fixing element 56 is an elongated stick-like member, and extends in a direction of an axis 56A thereof. The first fixing element 56 is, as illustrated in FIG. 9, formed with threads around one end portion (first end portion) 59 to form a male screw portion, and an end face of the other end portion (second end portion) 60 is formed with a driver hole (tool engaged portion). In the second end portion 60 of the first fixing element 56, the first pressing portion 52 is formed. The pressing portion 52 is formed in a tapered shape to become thinner from the second end portion 60 toward a first end portion 59 side.

The second fixing element 58 is a hollow member including a female screw portion 62 with which a male screw portion 61 of the first fixing element 56 is threadedly engaged. In a part of an outer peripheral face of the second fixing element 58, the second pressing portion 54 in a tapered shape is formed. An inclination angle of a taper of the pressing portion 54 of the second fixing element 58 is the same as that of the pressing portion 52 of the first fixing element 56. In a state where the pressing portion 54 of the second fixing element 58 is disposed to be opposed to the pressing portion 52 of the first fixing element 56, the second fixing element 58 is threadedly engaged with the first fixing element 56. As described above, the first fixing element 56 and the second fixing element 58 coupled to each other are relatively, rotationally operated so that a distance between the opposite pressing portions 52, 54 is changed In a side face of the second fixing element 58, a face portion 64 including a plain face 63 serving as a rotation prevention portion is formed. Therefore, the second fixing element 58 has a substantially D-like shape, on a cross-sectional surface orthogonal to the axis 58A of the second fixing element 58. On the other hand, in the through hole 36 of the second member, an abutted face 38 on which the face portion 64 as the rotation prevention portion can abut is formed. Thus, a rotation of the second fixing element 58 can be substantially prevented about the axis 58A of the second fixing element 58 in the through hole 36. The abutted face 38 of the second member 30 corresponds to a portion cooperating with the face 63 or the face portion 64 serving as the rotation prevention portion of the second fixing element 58 to prevent the second fixing element from rotating due to rotation of the first fixing element. On the other hand, the abutted face 38 of the second member 30 performs a guiding function of the second fixing element 58 in the through hole 36.

The first fixing element 56 and the second fixing element 58 are disposed in the through hole 36 in a state of being coupled to each other. The second fixing element 58 is inserted into one reception hole 34 and disposed on one end portion of the through hole 36, and the first fixing element 56 is inserted from the other end portion of the through hole 36. The first fixing element 56 and the second fixing element 58 are threadedly engaged with each other in the through hole 36, i.e., coupled in a screw style. As descried above, since, when being disposed in the through hole 36 of the second member 30, the second fixing element 58 is restricted not to rotate about the axis thereof, the second fixing element 58 can be easily screwed with the first fixing element 56 by the rotation of the first fixing element 56.

The first fixing element 56 has the pressing portion 52 in a tapered shape, the second fixing element 58 has the pressing portion 54 in a tapered shape, and the pressing portions 52, 54 have partially larger diameter compared to that of a center portion 56c of the first fixing element 56. On the other hand, both end portions 36d, 36e of the through hole 36 are formed larger than a center portion 36c of the through hole 36 to allow the pressing portion 52 of the first fixing element 56 to get in and out, but, the center portion 36c thereof is formed not to allow the pressing portion 52 of the first fixing element 56 to pass through. Therefore, the first fixing element 56 cannot pass through the through hole 36. The second fixing element is formed with the face 63 or the face portion 64 serving as the rotation prevention portion, and a shoulder portion 64a of the second fixing element is formed so as to project (refer to FIG. 10). By existence of the shoulder portion 64a, the second fixing element 58 can move in an axial direction of the through hole within a predetermined area, but it cannot get in and out of the through hole 36 in the axial direction of the through hole (refer to FIGS. 8 and 10). Further, the second pressing portion 54 of the second fixing element 58 is formed not to pass the center portion 36c of the through hole 36. Therefore, the second fixing element 58 inserted into the through hole 36 from the reception hole 34 cannot pass through the through hole 36. Thus, the first fixing element 56 and the second fixing element 58 coupled to each other do not drop off the through hole 36. The both end portions of the through hole 36 have a circular shape appropriate for the second end portion 60 of the first fixing element 56 of the fixing member 50.

Further, the through hole 36 is formed with the portion where the face portion 64 can be abutted, i.e., the abutted face 38 serving as the rotation prevention portion at both end portions, which are formed in the same shape, so that the first pressing portion 52 and the second pressing portion 54 may be disposed at either end portion. A part of the center portion 56c of the first fixing element 56 is formed larger than the male screw portion of the first end portion 59, but, the center portion 56c may not be formed large as described above.

As to the fixing member 50 formed by coupling the first fixing element 56 to the second fixing element 58, when it is disposed in the through hole 36, the distance between the two pressing portions 52, 54 can be changed by rotating the first fixing element 56 with a tool such as a wrench. When the first fixing element 56 and the second fixing element 58 coupled to each other are in a first released state where, in the through hole 36, the distance between the pressing portion 52 of the first fixing element 56 and the pressing portion 54 of the second fixing element 58 is a predetermined distance or more, insertion of the protruding portion 16 of the first member 10 into the reception hole 34 of the second member 30 and removal of the protruding portion 16 thereof from the reception hole 34 thereof can be performed. On the other hand, when the first fixing element 56 and the second fixing element 58 coupled to each other are in a second fixed state where, in the through hole 36, the distance between the pressing portion 52 of the first fixing element 56 and the pressing portion 54 of the second fixing element 58 is narrow, i.e., when the distance therebetween is narrower than that in the first released state (refer to FIG. 12), the protruding portion 16 can obtain the fixing force so that fixing of the first member 10 to the second member 30 can be performed. Therefore, with the first fixing element 56 and the second fixing element 58 coupled to each other in the through hole 36, insertion of the protruding portion 16 of the first member 10 into the reception hole 34 of the second member 30, removal of the protruding portion 16 from the reception hole 34, and fixing of the protruding portion 16 can be performed. When the first pressing portion 52 and the second pressing portion 54 are in the second fixed state, they are separated by a predetermined fixed distance away from each other. FIG. 12 is, in the coupled assembly illustrated in FIG. 3, a partial cross-sectional view on a plane that is orthogonal to the axis A of the assembly and includes the axis of the through hole of the second member, in a direction from a first member side to a second member side. However, FIG. 12 indicates one example with virtual lines when the first fixing element 56 and the second fixing element 58 are in the first released state, and with solid lines when they are in the second fixed state.

A coupling operation between the first member 10 and the second member 30 will be described below.

First, the second fixing element 58 is inserted into one reception hole 34 of the two reception holes, and disposed at one end portion of the through hole 36. Further, the first fixing element 56 is inserted from the other end portion of the through hole 36. With this arrangement, the first end portion 59 of the first fixing element 56 formed with the male screw portion 61 passes through the center portion 36c of the through hole 36 to be screwed with the second member 58. With this arrangement, with the second fixing element 58 screwed with the first fixing element 56, the fixing member 50 is disposed in the through hole 36.

To insert the protruding portion 16 of the first member 10 into the reception hole 34 of the second member 30, as necessary, the second end portion 60 of the first fixing element of the fixing member disposed in the through hole 36 is rotated to widen the distance between the first pressing portion 52 of the first fixing element 56 and the second pressing portion 54 of the second fixing element 58. With this arrangement, the pressing portion 52 of the first fixing element 56 and the pressing portion 54 of the second fixing element 58 are set in the first released state. At this point, the fixing member 50 including the first fixing element 56 and the second fixing element 58 can be, as illustrated with the virtual line in FIG. 12, in a state where the fixing member 50 partially gets out of the through hole 36. The first released state means a state where the first fixing element 56 and the second fixing element 58 are coupled to each other, and the insertion of the protruding portion 16 of the first member 10 into the reception hole 34 of the second member 30 and the removal of the protruding portion 16 from the reception hole 34 can be performed.

Next, the protruding portions 16 are inserted into the reception holes 34 so that the end face 15 of the first member 10 can be abutted on the end face 33 of the second member 30. At this point, certain spaces are provided among the fixing member 50 of the through hole 36, the second member 30 and the protruding portion 16 of the first member 10, and over the axis of the through hole 36 and that of the fixing member 50 toward the inner side of the reception hole 34, the leading end portion 18 of the protruding portion 16 of the first member 10 is substantially positioned.

With the first member 10 and the second member 30 respectively abutted on the coupling faces 15, 33, the wrench or the like is inserted into the driver hole of the first fixing element 56 to rotate the first fixing element 56 (i.e., applying the force to one end portion of the fixing member 50). Due to the rotation of the first fixing element 56, the distance between the pressing portion 52 of the first fixing element 56 and the pressing portion 54 of the second fixing element 58 becomes gradually narrower, and then the pressing portion 52 of the first fixing element 56 and the pressing portion 54 of the second fixing element 58 are changed from the first released state into the second fixed state. Since the distance between the pressing portions 52, 54 of the fixing member 50 becomes narrow to some extent so that they reach the fixing position, each of the pressing portions 52, 54 presses the corresponding protruding portion 16 against an inner wall of the reception hole 34 of the second member. Further, the abutment face of the protruding portion 16 of the first member 10, i.e., the face portion 19 includes an inclining face where its normal line includes a component oriented to the end face 15 of the first member 10 as illustrated in FIG. 6. Therefore, each protruding portion 16 can receive a drawing force from the corresponding pressing portion of the fixing member toward a second member 30 side at a time. FIG. 6 illustrates a virtual circle IC as the fixing member to help easy understanding of the fixing member, but a position and a size of the circle IC do not always coincide with a position and a size of the fixing member 50. As described above, since the protruding portion 16 receives two different forces, i.e., a pressing force (including a force component on the face orthogonal to the axis A) and the drawing force (including a force component parallel to the axis A), the first member 10 and the second member 30 are firmly coupled to each other. Further, since the protruding portion 16 includes such an inclining face, the leading end of the protruding portion 16 of the first member 10 is nearly positioned beneath the fixing member 50. Thus the protruding portions 16 are hooked by the first fixing element 56 and the second fixing element 58 so that the protruding portion 16 of the first member 10 cannot be removed from the reception hole 34 of the second member 30.

Furthermore, since the distance between the pressing portions 52, 54 of the fixing member 50 varies depending on the rotational operation at one end portion of the fixing member 50, a substantially same amount of force can be applied to the protruding portions 16 corresponding to the pressing portion 52 of the first fixing element 56 and the pressing portion 54 of the second fixing element 58, respectively, at an almost same time. Therefore, a bending stress unnecessary for the first member 10 can be prevented or reduced from being applied.

Further, as illustrated in FIG. 12, a contact portion between one protruding portion (first protruding portion) 16A of the first member and the first fixing element 56, and a contact portion between the other protruding portion (second protruding portion) 16B of the first member and the second fixing element 58 are located at different sides from each other with respect to the rotation axis 50A of the fixing member 50, viewed in a direction of the axis A of the assembly. In other words, when viewed from a direction illustrated in FIG. 12, the two protruding portions 16A, 16B are disposed to sandwich the fixing member 50. With this arrangement, the force can be easily, evenly applied to the two protruding portions 16.

From the firmly coupled state, i.e., the fixed state of the first member 10 to the second member 30, in order to separate them from each other, one end portion of the fixing member 50 is rotated to widen the distance between the pressing portions 52, 54. With this arrangement, the pressing portions 52, 54 of the fixing member are changed from the second fixed state to the first released state. Therefore, the protruding portion 16 of the first member 10 can be removed from the reception hole 34 of the second member 30.

As described above, by applying the force only to one end portion of one element, of the first fixing element and the second fixing element, configuring the fixing member, i.e., by one operation, the even fixing force can be applied between the first member and the second member. With this arrangement, the first member can be easily mounted to the second member, and can be removed therefrom.

Further, by commonalizing or standardizing the coupling device, the first members of the different type can be mounted to a single second member. For example, for the head or cutting-edge exchange type drill in which the first member can be configured as the throw-away tip and, further, the second member is configured as the tool main body, of the plurality of first members, i.e., cutting parts having the different outer diameters, one first member can be selected depending on the diameter of the hole to be processed, and then mounted to the common second member. Therefore, the holes having the different sizes can be processed by the least number of components. Thus, the management cost of the tool can be reduced.

According to the first embodiment, the second fixing element of the fixing member cannot get in and out of the through hole in the axial direction of the through hole of the second member. However, in order for the second fixing element to get in and out of the through hole in the axial direction of the through hole, both or either of the through hole and the second fixing element may be changed in design.

Next, with reference to FIGS. 13 to 20, the second embodiment according to the present invention will be described. In a cutting tool 100 of the second embodiment, a coupling device having a substantially same configuration as the coupling device 70 of the above described first embodiment is adopted, and the tool leading end portion as the first member using the coupling device is coupled to the tool body as the second member. Therefore, by using the same reference symbol for the constituent element corresponding to the above described constituent element, the coupling device of the second embodiment will be briefly described below.

A first member 110 of the second embodiment is configured as the tool leading end member and, particularly, as a drill leading end member. The first member 110 includes two insert-mounting seats 181, 182. A cutting insert 183 that is a member including a cutting edge is mounted on each insert mounting seat. According to the second embodiment, each of the two cutting inserts 183 of a same type is removably mounted on the first member 110 with a screw. However, it may be configured in such a manner to mount the cutting inserts of different types.

Figure 14:
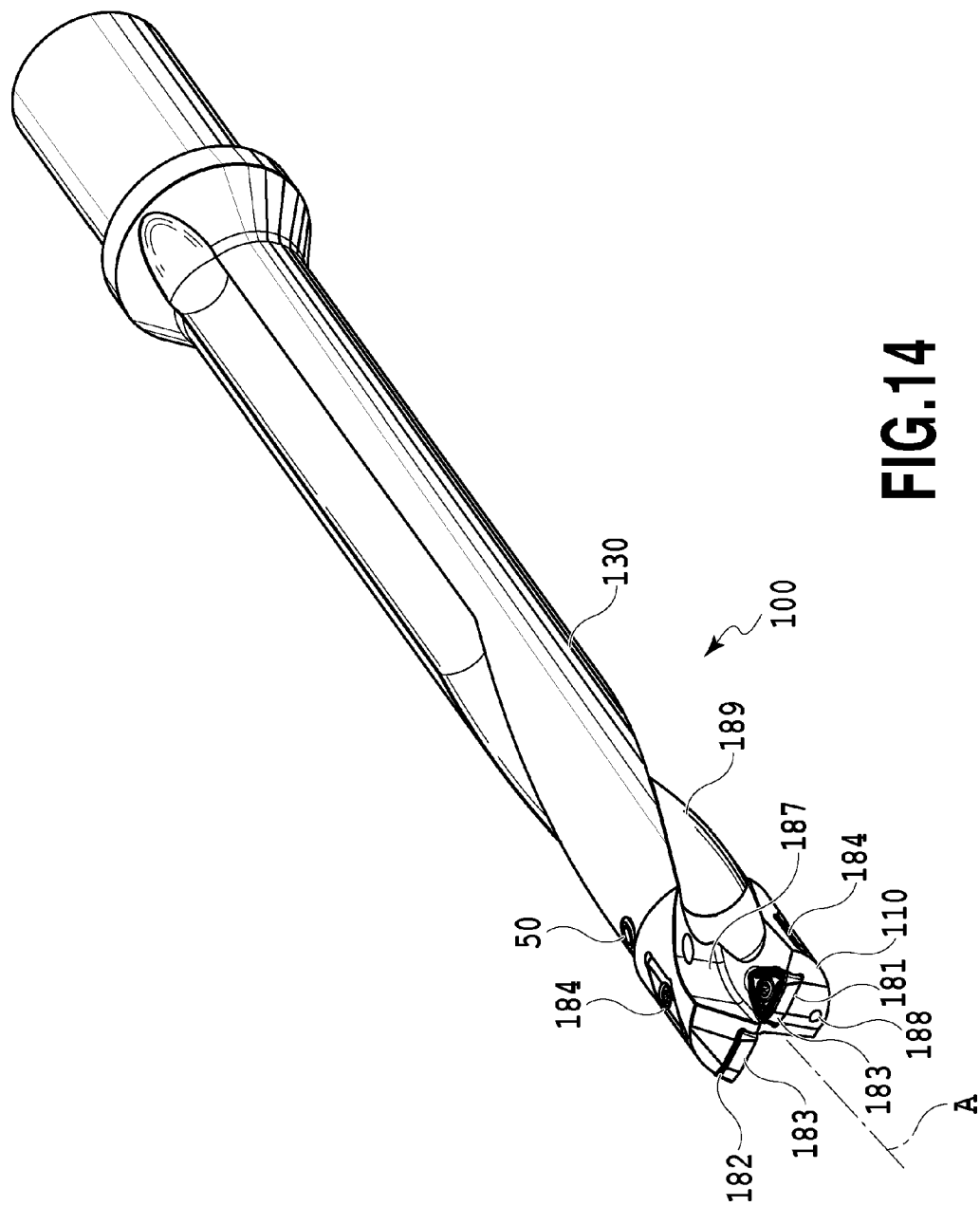
FIG. 14 is a perspective view of the cutting tool of the second embodiment illustrated in FIG. 13.
Figure 15:
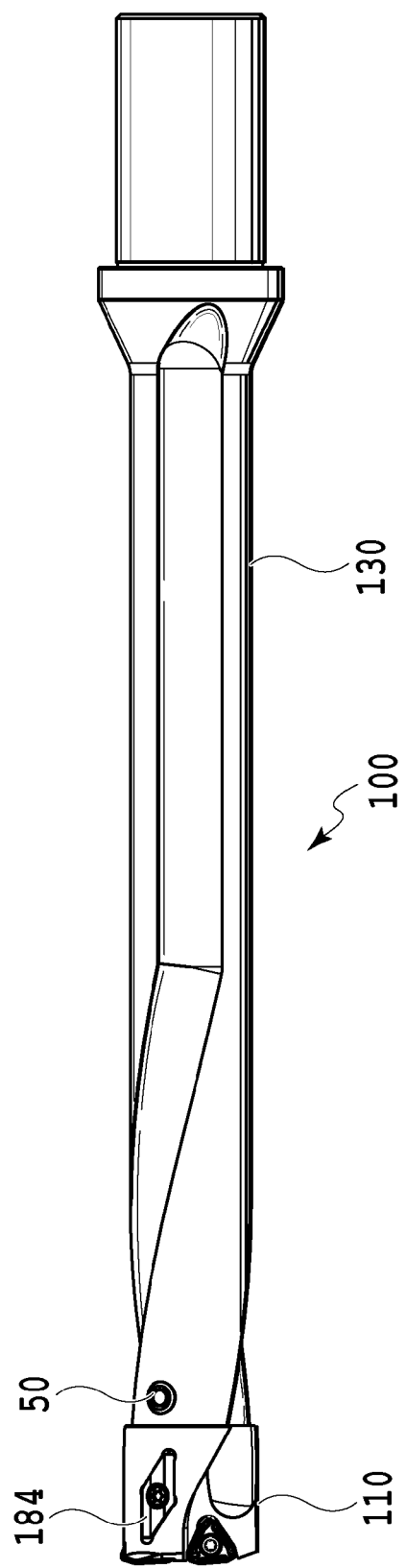
FIG. 15 is a plan view of the cutting tool of the second embodiment.
Figure 16:
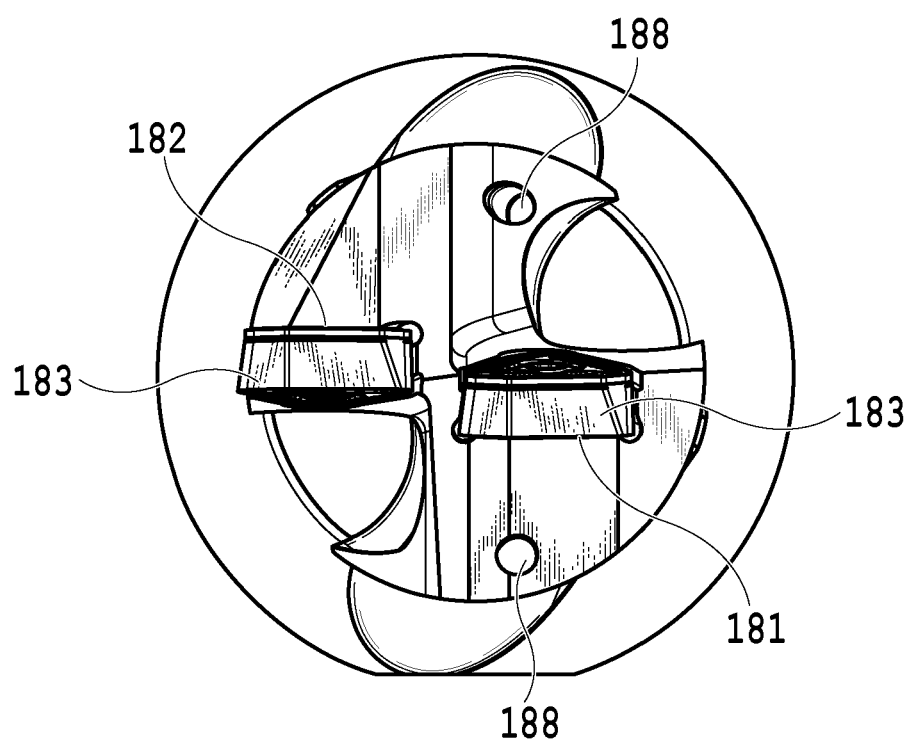
FIG. 16 is a front view of the cutting tool of the second embodiment.
Figure 17:
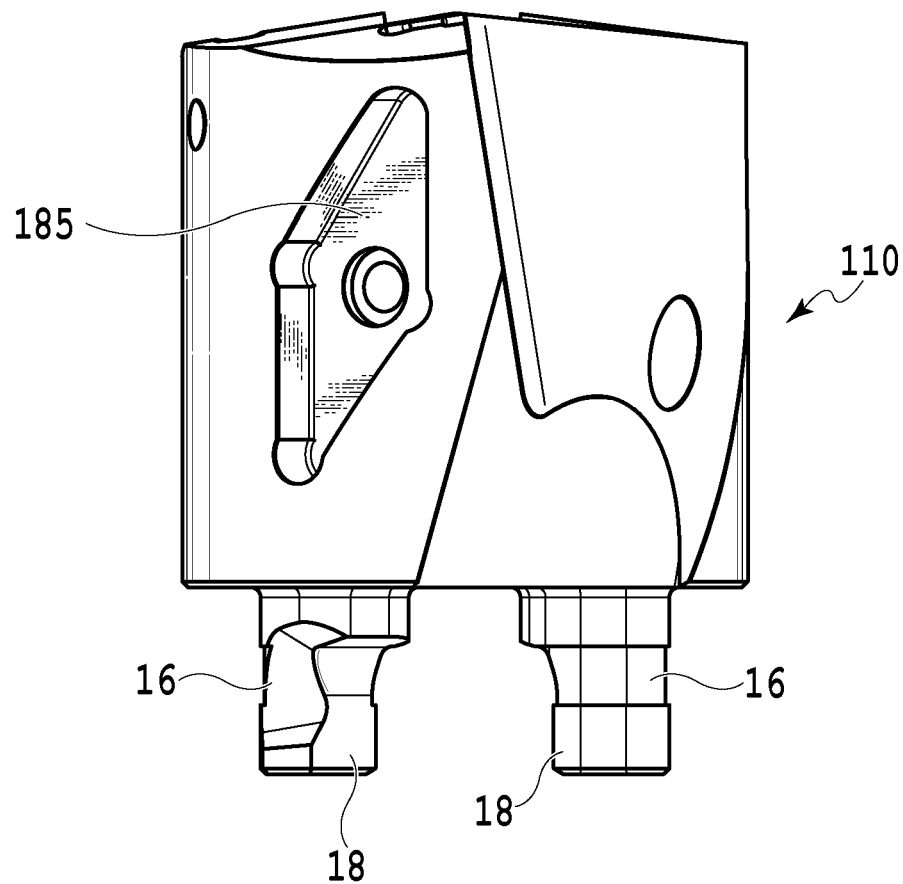
FIG. 17 is a front view of a tool leading end member of the second embodiment as a first member.
Figure 18:
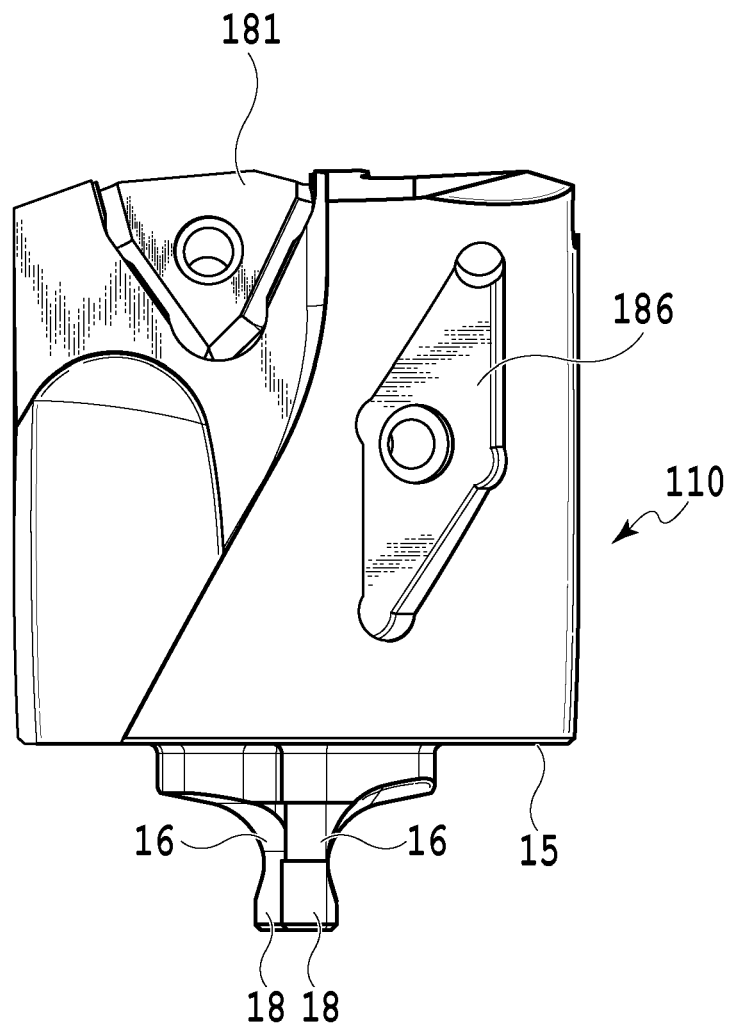
FIG. 18 is a side view of the tool leading end member of the second embodiment.
Figure 19:
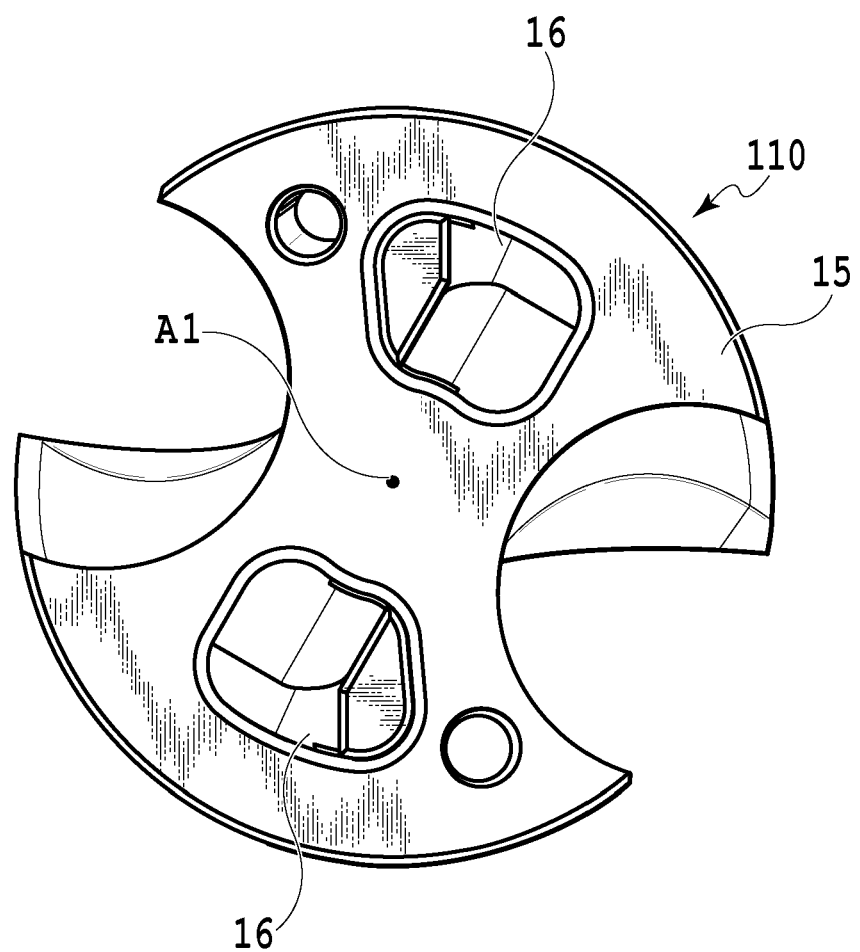
FIG. 19 is a bottom view of the tool leading end member of the second embodiment.

The two insert mounting seats 181, 182 include a center-side insert mounting seat 181 provided near a tool axis (or, a tool rotation axis) A and an outer-peripheral side insert-mounting seat 182 provided at an outer peripheral side (particularly refer to FIGS. 14, 16). The first member 110 is designed such that a rotational track about the axis A of the usable cutting edge in the cutting insert 183 mounted to the center-side insert mounting seat 181 is partially superimposed with a rotational track about the axis A of the usable cutting edge in the cutting insert 183 mounted to the outer-peripheral-side insert mounting seat 182.

Further, the first member 110 includes two mounting seats 185, 186 to which each guiding pad 184 is removably mounted, on an outer peripheral face of the first member 110. The guiding pad 184 may be replaced with a member having a function for processing a hole-side face. In addition, a chip discharging groove 187 and an oil hole 188 are formed in the first member 110.

Figure 20:
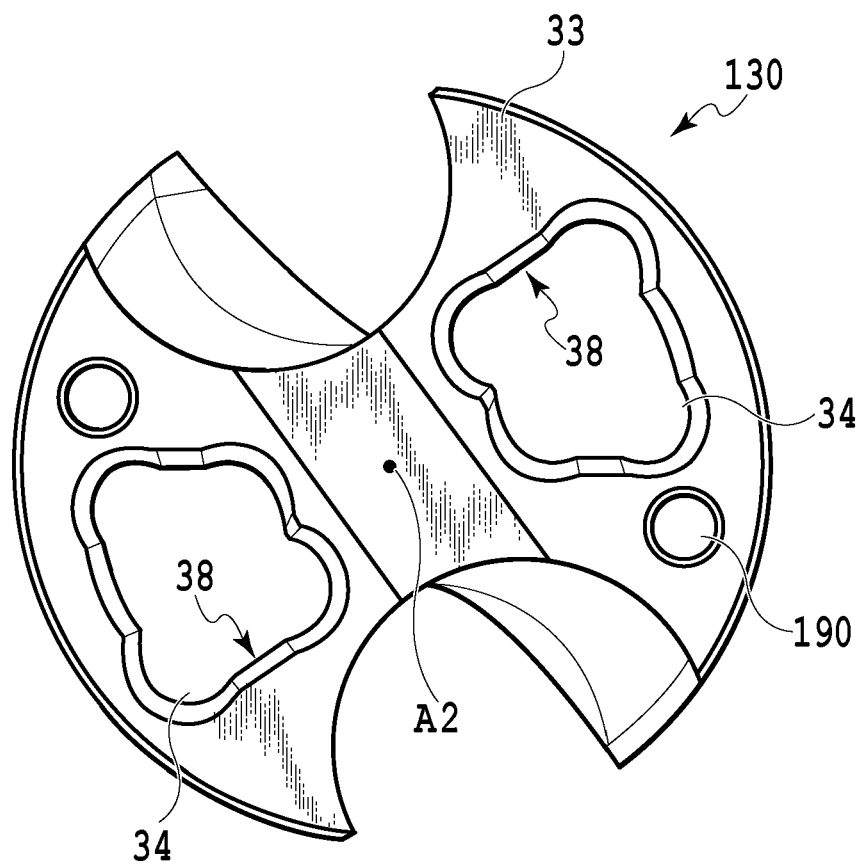
FIG. 20 illustrates a part of a tool body of the second embodiment as a second member and is a plan view of the part thereof.

A second member 130 of the second embodiment is configured as a tool body and, particularly, as a drill body. The second member 130 includes a chip discharging groove 189 in a helical shape and an oil hole 190. FIG. 20 illustrates a part of the second member 130, which illustrates a leading end portion to be coupled with the first member 110 without other parts illustrated.

To couple the first member 110 to the second member 130, the coupling device having a substantially same configuration as that of the first embodiment is adopted. The coupling device of the second embodiment is clearly different from the coupling device 70 of the above described first embodiment in a shape of the first fixing element, but, is almost the same in other configurations. The coupling device of the second embodiment will be briefly described below.

In an end face (coupling face) 15 of the first member 110, the two same protruding portions 16 are formed. The two same protruding portions 16 are formed in rotational symmetry with respect to the axis A1 of the first member 110 which can coincide with the tool axis A. The leading end portion 18 of the protruding portion 16 is formed thick. The protruding portion 16 of the first member has a shape corresponding to the pressing portion in a tapered shape, of the fixing member.

In an end face (coupling face) 33 of the second member 130, the two same reception holes 34 are formed. The two same reception holes 34 are formed in rotational symmetry with respect to the axis A2 of the second member 130 which can coincide with the tool axis A. In the second member 130, the through hole 36 is formed such that the through hole 36 connects with the two reception holes 34. The through hole 36 is formed such that the axis of the through hole 36 extends on the plane orthogonal to the axis of the second member. The through hole 36 is formed to dispose the fixing member 50, and thus, the above described abutted face 38 is formed at the both end portions of the through hole 36.

The fixing member 50 consists of the first fixing element 56 including the first pressing portion 52 in a tapered shape, and a second fixing element 58 including the second pressing portion 54 in a tapered shape. The one end portion of the first fixing element 56 is formed with the male screw portion and the other end portion 60 is formed with the driver hole and also the first pressing portion 52. The center portion of the first fixing element 56 is formed in a straight shape unlike the center portion of the first fixing element of the first embodiment, and is not particularly made thicker than the screw portion (refer to FIG. 13). However, the center portion of the first fixing element 56 may be made thick like the center portion of the first fixing element 56 of the first embodiment. The second fixing element 58 is formed with the female screw portion with which the male screw portion of the first fixing element 56 is threadedly engaged. When being disposed in the through hole 36, in such a manner that the first pressing portion 52 is opposed to the second pressing portion 54, the first fixing element 56 is threadedly engaged with the second fixing element 58. With the first fixing element 56 and the second fixing element 58 threadedly engaged with each other in the through hole 36, the wrench is engaged with the driver hole of the first fixing element 56 to rotate the first fixing element so that the first fixing element 56 is operated relative to the second fixing element 58, and thus the distance between the first pressing portion 52 and the second pressing portion 54 varies accordingly.

When the first pressing portion 52 and the second pressing portion 54 are set in the first released state, each protruding portion 16 of the first member 110 can be inserted into the corresponding reception hole 34 of the second member 130 and, further, can be removed from the reception hole 34. When the first pressing portion 52 and the second pressing portion 54 are set in the second fixed state, the protruding portion 16 of the first member 110 inserted into the reception hole 34 of the second member 130 receives a pressing force and the drawing force, and thus the first member is firmly fixed to the second member.

Figure 21:
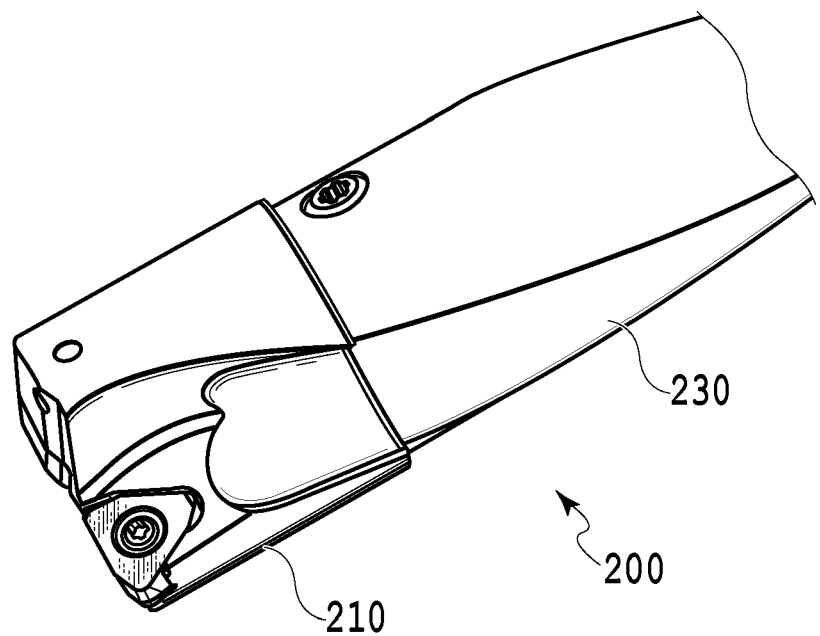
FIG. 21 is a perspective view of a leading end side portion of a cutting tool of a third embodiment according to the present invention.

Next, with reference to FIG. 21, a third embodiment according to the present invention will be described. A cutting tool 200 of the third embodiment uses the same coupling device as that of the above described first embodiment, and the tool leading end member as the first member is coupled with the tool body as the second member. Therefore, an explanation of the coupling device of the third embodiment will be omitted herein.

The tool leading end portion as a first member 210 of the third embodiment has a configuration in which the mounting seat to which the guiding pad is mounted on the outer peripheral face is removed from the first member 110 of the second embodiment. Except for not including the mounting seat on the outer peripheral face, the first member 210 of the third embodiment has the substantially same configuration as the first member 110 of the second embodiment.

A second member 230 of the third embodiment is configured as the tool body and, particularly, as the drill body. FIG. 21 illustrates only the leading end portion, of the second member 230. The second member 230 of the third embodiment has the substantially same configuration as the second member 130 of the second embodiment.

Figure 22:
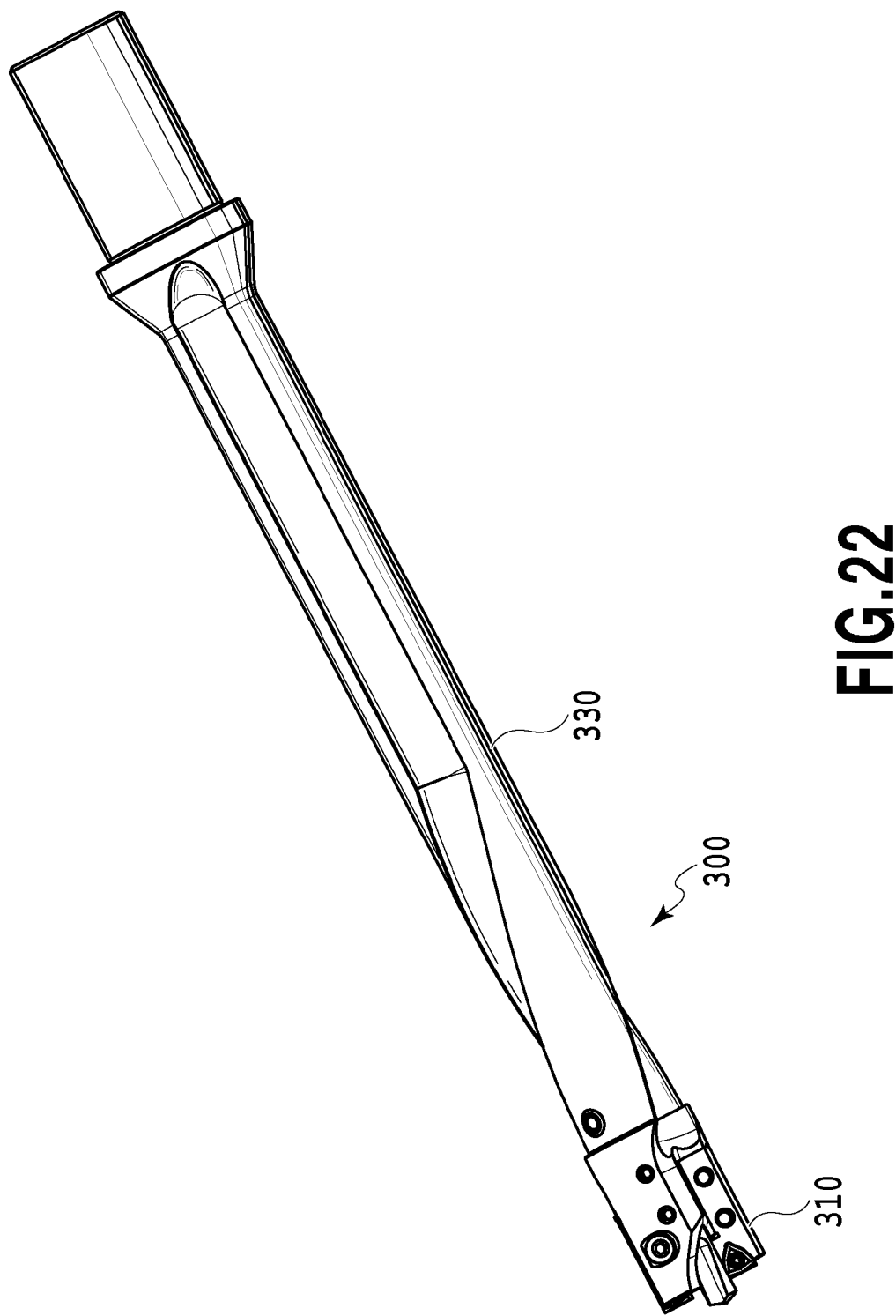
FIG. 22 is a perspective view of a cutting tool of a fourth embodiment according to the present invention.
Figure 23:
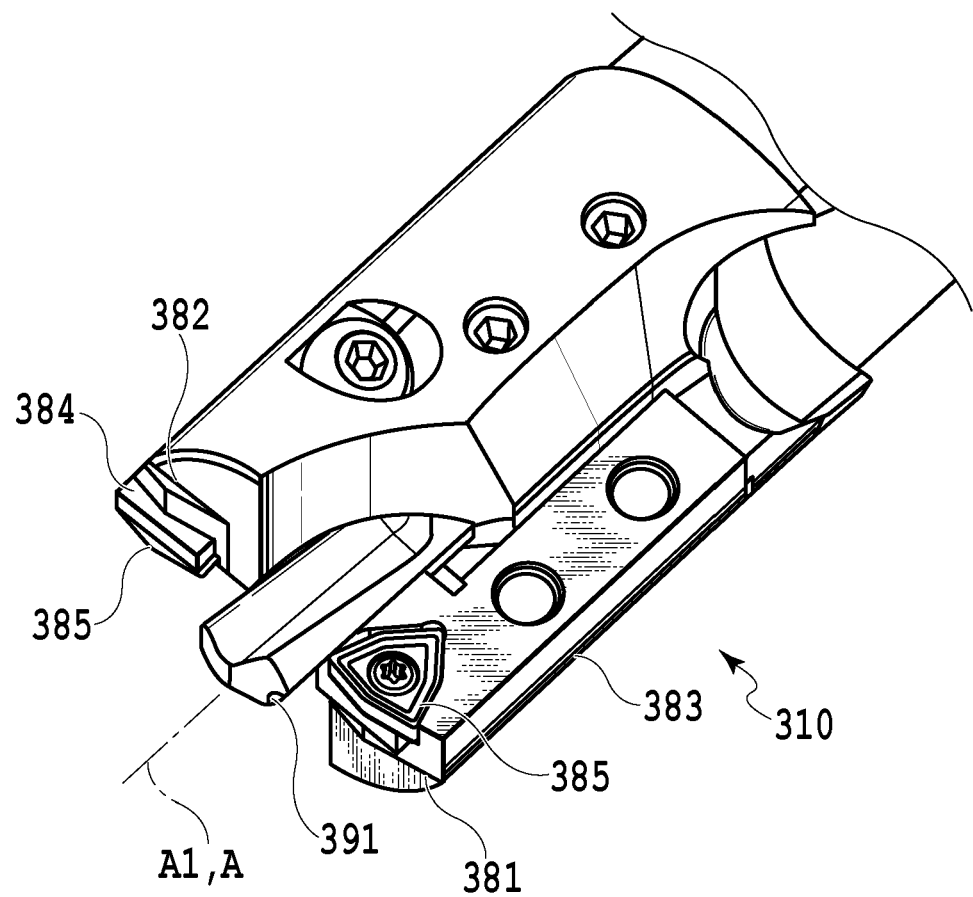
FIG. 23 is a perspective view of a leading end side portion of the cutting tool of the fourth embodiment.

Next, with reference to FIGS. 22 and 23, a fourth embodiment according to the present invention will be described. A cutting tool 300 of the fourth embodiment uses the same coupling device as the above described first embodiment, and the tool leading end member as a first member 310 is coupled to the tool body as a second member 330. Therefore, an explanation of the coupling device of the fourth embodiment will be omitted herein.

The tool leading end portion as the first member 310 of the fourth embodiment is configured to removably dispose a drill insert 391 along the axis A1. The drill insert 391 can be used to make a prepared hole.

Further, the first member 310 includes two insert mounting seats 381, 382. To each of the insert mounting seats, via predetermined cartridges 383, 384, a cutting insert 385 is removably mounted. The two insert mounting seats include an intermediate insert mounting seat 381 configured to dispose the cutting insert relatively near the tool axis (or, a tool rotational axis) A and the outer peripheral side insert mounting seat 382 configured to dispose the cutting insert at the outer peripheral side (particularly refer to FIG. 23). The first member 310 is designed such that a rotational track about the axis A of the usable cutting edge in the cutting insert 385 mounted to the intermediate insert mounting seat 381 is partially superimposed with a rotational track about the axis A of the usable cutting edge in the cutting insert 385 mounted to the outer peripheral side insert mounting seat 382. Further, the first member 310 is designed such that the rotational track about the axis A of the usable cutting edge in the cutting insert mounted to the intermediate insert mounting seat is partially superimposed with the rotational track of the above described drill insert 391.

In the first member 310 of the fourth embodiment, the cutting insert is mounted via the cartridge as described above. Therefore, the first member 310 can be protected by the cartridge and, further, by using the cartridges of the different types, the position of the cutting insert can be changed.

According to the first to fourth embodiments described above, in the through hole of the second member, the fixing member integrally formed of a plurality of elements threadedly engaged with each other can be selectively positioned in the first released state where the protruding portion of the first member can get in and out of the reception hole or in the second fixed state where the first member is fixed to the second member. However, the fixing member may be configured not to be set in such a first released state in the through hole. In other words, when the fixing member integrally formed of the plurality of elements is disposed in the through hole, the protruding portion of the first member may not be able to get in and out of the reception hole of the second member. In this case, after the protruding portion is inserted into the reception hole without the fixing member integrally formed, the plurality of elements of the fixing member are inserted into the through hole and threadedly engaged with each other, and then the first member is fixed to the second member. When the first member is removed from the second member, the plurality of elements of the fixing member is disengaged, and then the fixing member may be partially or entirely removed from the through hole.

Next, with reference to FIG. 24, a fifth embodiment according to the present invention will be described. An assembly of the fifth embodiment includes a different coupling device from those of the first to fourth embodiments described above and, except for the configuration related to the coupling device, the first member and the second member have the substantially same configuration as those of the first embodiment. Thus, only the coupling device will be described herein. However, the same reference symbol for the constituent element corresponding to the constituent element described above will be used below, and the detailed explanation of each constituent element will be omitted.

In the coupling device of the fifth embodiment, the fixing member 50 is configured such that the first pressing portion 52 faces an opposite side of the second pressing portion 54. FIG. 24 illustrates that the fixing member 50 is disposed in the through hole 36 of the second member, and the first pressing portion 52 and the second pressing portion 54 are set in the second fixed state. FIG. 24 illustrates that the two protruding portions 16 of the first member inserted into the reception hole 34 of the second member are firmly pressed and fixed by the first pressing portion 52 and the second pressing portion 54. Since the protruding portion 16 of the first member has a shape corresponding to the pressing portion of the fixing member in the tapered shape, in a similar manner to the above described first to fourth embodiments, the first member receives the pressing force and the drawing force to be fixed to the second member accordingly.

According to the fifth embodiment, the fixing member 50 is formed by three members, i.e., the first, second and third fixing elements. The first fixing element 56 is a member including two male screw portions, and one end portion of the first fixing element 56 includes a driver hole. The second fixing element 58 includes the female screw portion to screw with the first male screw portion 391 at the leading end side of the first fixing element 56, and includes the second pressing portion 54 that is integrated with it. A third fixing element 392 includes a female screw portion to screw with a second male screw portion 393 formed between a first male screw portion and a driver hole of the first fixing element 56, and includes the first pressing portion 52 that is integrated into the third fixing element.

The through hole 36 of the second member is formed with a guiding groove 394 extending from one end portion through to the other end portion in the axial direction of the through hole 36, that is, opening at the both end portions. The guiding groove 394 corresponds to the above described abutted face 38, and cooperates with a face portion including a plane surface as the rotation prevention portion of the second fixing element 58 and a face portion including a plane surface serving as the rotation prevention portion of the third fixing element 392, and performs a function for preventing the their rotating operations in the through hole.

When being disposed in the through hole, the first, second, and third fixing elements 56, 58, 392 are formed such that, by the rotation of the first fixing element, the second fixing element 58 and the third fixing element 392 are moved in an opposite direction to each other to change the distance between the first pressing portion 52 and the second pressing portion 54. According to the fifth embodiment, with the fixing member screwed with each other and integrally formed, the fixing member is inserted into the through hole and disposed there.

Figure 24:
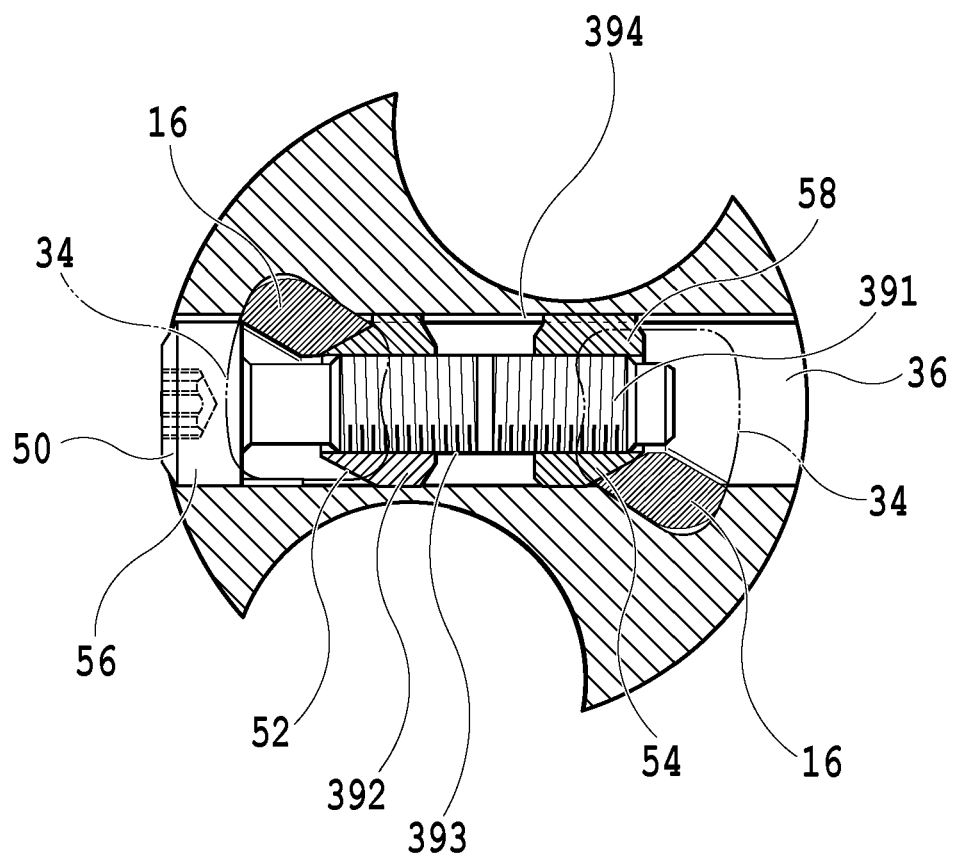
FIG. 24 is a partial cross-sectional view of an assembly of a fifth embodiment according to the present invention, and corresponds to FIG. 12 illustrating the first embodiment.

From the fixed state as illustrated in FIG. 24, in order to separate the first member and the second member from each other, the first fixing element 56 is rotated, the distance between the second fixing element and the third fixing element is narrowed, and then the distance between the first pressing portion 52 and the second pressing portion 54 is narrowed. Therefore, the first pressing portion 52 and the second pressing portion 54 are set into the first released state. With this arrangement, a gap is generated around the protruding portion 16 of the first member, and then the protruding portion 16 can be removed from the reception hole 34 accordingly.

According to the fifth embodiment described above also, the rotation operation on one end portion of the fixing member can selectively realize the state where the protruding portion of the first member can get in and out of the reception hole of the second member or the state where the first member is firmly fixed to the second member.

Figure 25:
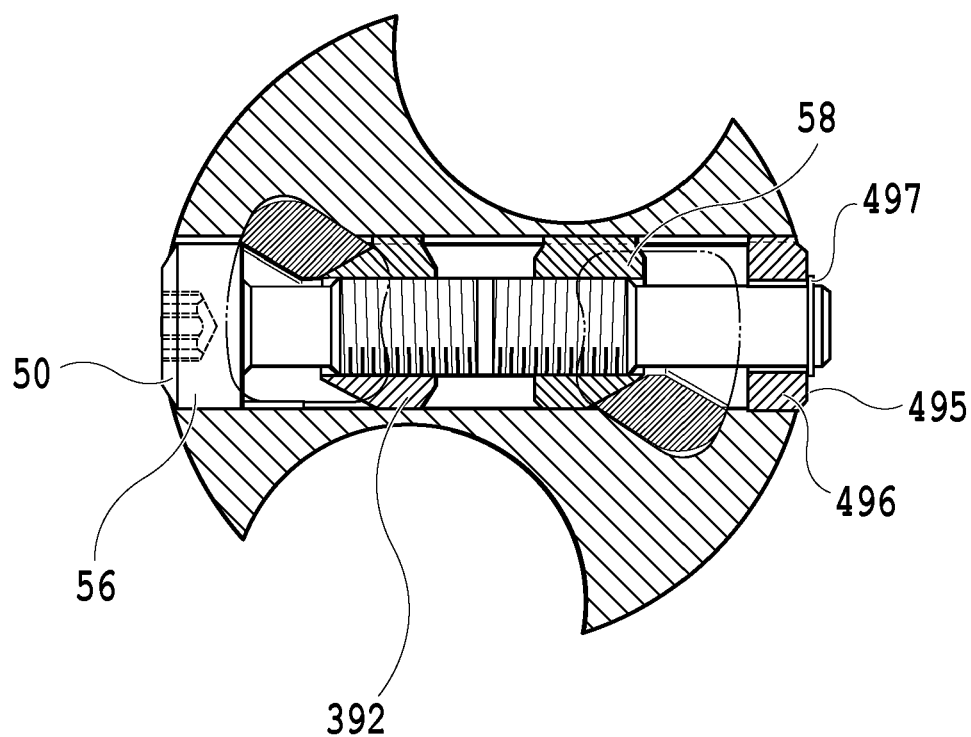
FIG. 25 is a partial cross-sectional view of an assembly of a sixth embodiment according to the present invention, and corresponds to FIG. 12 illustrating the first embodiment.

Next, with reference to FIG. 25, a sixth embodiment according to the present invention will be described below. An assembly of the sixth embodiment is partially different from the above described fifth embodiment in the coupling device, and the same as the fifth embodiment in other configurations. Thus, herein, only the differences between the sixth embodiment and the fifth embodiment will be described. However, the same reference symbol for the constituent element corresponding to the constituent element described above will be used below, and the detailed explanation of each constituent element will be omitted.

The coupling device of the sixth embodiment includes a sealing member 495 disposed to prevent the chips and the like from entering the through hole 36, on an end portion of a second member 58 side of the fixing member 50. The sealing member 495 includes a cylindrical member 496 disposed around the first fixing element 56 and a stopper 497. Since the cylindrical member 496 has an inner diameter larger than an outer diameter of a portion of the first fixing element positioned inside the cylindrical member 496, the first fixing element is not prevented from rotating. The stopper 497 is a member of a set-in type and mounted to the leading end portion of the first fixing element. The stopper 497 prevents the cylindrical member 496 from removing from the through hole 36 and the chips and the like from entering between the cylindrical member 496 and the first fixing element 56. The cylindrical member may be configured as a bearing member firmly set in around the first fixing element.

The coupling device of the fifth embodiment or the sixth embodiment can be adopted to couple the first member and the second member of the second to fourth embodiments.

As described above, the present invention is described based on the first to sixth embodiments, but, various types of modification can be allowed. For example, according to the some embodiments described above, the coupling device according to the present invention is applied to the cutting-edge exchange type drill as one of the rotational cutting tool, but, the present invention can be applied to the cutting tools of other embodiments such as a lathe turning tool and a rotary cutting tool. The coupling device according to the present invention can be used not only for the cutting tool and the cutting device but also for coupling various types of members such as various types of machine system members, electric system members, and chemical system members.

As to a shape of the leading end of the protruding portion of the first member, it may not be limited to the L-like shape, and a polygonal columnar shape including a bottom face in a columnar shape or a rectangular shape can be adopted. Further, according to the above described first to sixth embodiments, substantially, the first member is the tool leading end member or a member imitating the tool leading end member, and the second member is the tool body or a member imitating the tool body. However, the first member may be the tool body, and the second member may be the tool leading end member. In other words, the protruding portion may be provided on the tool body, and the reception hole and the through hole may be provided in the tool leading end member. Further, the cutting edge may be directly or indirectly provided on the tool body.

The above described embodiments and their modification examples describe the present invention specifically to some extent, but the present invention is not limited thereto. As to the present embodiment, it should be understood that various changes and modifications can be made without departing from the spirit and scope of the invention described in the claims. In other words, the present invention includes any kinds of modification examples, application examples, and equivalents included in the spirits of the present invention specified by the claims.

What is claimed is:

1. A coupling device for coupling a first member having a first axis and a second member having a second axis, comprising:

two protruding portions provided on the first member, the two protruding portions being across from one another on opposite sides of a longitudinal first plane containing the first axis;
a through hole formed to pass through the second member, the through hole having a through hole axis;
the second member having a longitudinal second plane perpendicular to the through hole axis and containing the second axis;
two reception holes provided in the second member, the two reception holes being across from one another on opposite sides of the longitudinal second plane, each reception hole formed to connect to the through hole and to receive one of the protruding portions; and
a fixing member including a first pressing portion and a second pressing portion, wherein the fixing member is configured to, when being disposed in the through hole, be able to move the first pressing portion and the second pressing portion and change a distance between the first pressing portion and the second pressing portion due to application of a force to one end portion of the fixing member, and wherein
the first pressing portion is formed to be able to contact and exert a fixing force on one of the two protruding portions received in one of the two reception holes and
the second pressing portion is formed to be able to contact and exert a fixing force on the other of the two protruding portions received in the other of the two reception holes.

2. The coupling device according to claim 1, wherein the two protruding portions are shaped to receive a drawing force from the fixing member, in a manner in which when the fixing member is disposed in the through hole, the first pressing portion presses one of the two protruding portions and the second pressing portion presses the other of the two protruding portions.

3. The coupling device according to claim 1,
wherein the fixing member comprises a first fixing element and a second fixing element having the second pressing portion;
wherein the first fixing element is configured to be threadedly engaged with the second fixing element;
wherein the second fixing element comprises a rotation prevention portion; and
wherein the second member has, when the fixing member is disposed in the through hole, a portion cooperating with the rotation prevention portion of the second fixing element to prevent the second fixing element from rotating due to rotation of the first fixing element.

4. The coupling device according to claim 3, wherein the first pressing portion is integrated into the first fixing element.

5. The coupling device according to claim 3,
wherein the fixing member further comprises a third fixing element to be threadedly engaged with the first fixing element, and
wherein the third fixing element has the first pressing portion that is integrated into the third fixing element.

6. The coupling device according to claim 1, wherein when the fixing member is disposed in the through hole of the second member, the first pressing portion and the second pressing portion are selectively positioned in a first released state where the protruding portion of the first member can be inserted into the reception hole or removed from the reception hole or in a second fixed state where a fixing force is exerted on the protruding portion.

7. The coupling device according to claim 6,
wherein the fixing member is configured such that the first pressing portion is opposed to the second pressing portion, and
wherein a distance between the first pressing portion and the second pressing portion in the first released state is longer than a distance between the first pressing portion and the second pressing portion in the second fixed state.

8. The coupling device according to claim 6,
wherein the fixing member is configured such that the first pressing portion and the second pressing portion face in opposite directions, and
wherein a distance between the first pressing portion and the second pressing portion in the first released state is shorter than a distance between the first pressing portion and the second pressing portion in the second fixed state.

9. The coupling device according to claim 1, wherein each of the first pressing portion and the second pressing portion has a tapered shape, and
wherein each of the two protruding portions has a recessed shape corresponding to the tapered shape.

10. A cutting tool comprising the coupling device according to claim 1.

11. A cutting tool according to claim 10, wherein the first member is one of a tool leading end member and a tool body, and the second member is the other of the tool leading end member and the tool body.

12. A cutting tool according to claim 11, wherein the first member directly includes a cutting edge.

13. A cutting tool according to claim 11, wherein a member with the cutting edge is removably mounted to at least one of the first member and the second member.

14. The coupling device according to claim 1, wherein
each of the two reception holes is opened on a coupling face which the first member abuts, when coupling the first member and the second member.

15. The coupling device according to claim 1, wherein
the through hole includes two portions in which the first pressing portion and the second pressing portion can be disposed, respectively and a center portion located between the two portions, and
the center portion of the through hole is formed such that the first pressing portion and the second pressing portion cannot enter and pass through the center portion.

16. The coupling device according to claim 1, wherein
the fixing member has a rotation axis; and
the first pressing portion and the second pressing portions contact their respective protruding portions on opposite sides of the fixing member's rotation axis.

17. A coupling device for coupling a first member and a second member, comprising:
two protruding portions provided on the first member;
a through hole formed to pass through the second member;
two reception holes provided in the second member, each reception hole connecting to the through hole and formed to receive one of the protruding portions;
a first fixing element having a first pressing portion formed thereon, the first fixing element and the first pressing portion having monolithic one-piece construction; and
a second fixing element having a second pressing portion formed thereon, the second fixing element configured to be threadedly engaged with the first fixing element, wherein:

when the first fixing element and the second fixing element are disposed in the through hole with the second fixing element threadedly engaged to the first fixing element, and the first fixing element is rotated:
the second fixing element translates within the through hole while being prevented from rotating therein, thereby changing a distance between the first pressing portion and the second pressing portion,
the first pressing portion contacts and exerts a fixing force on one of the two protruding portions; and
the second pressing portion contacts and exerts a fixing force on the other of the two protruding portions.

18. The coupling device according to claim 17, wherein the two protruding portions are shaped to receive a drawing force from the first fixing element and the second fixing element, in a manner in which when the first fixing element and the second fixing element are disposed in the through hole, the first pressing portion presses one of the two protruding portions and the second pressing portion presses the other of the two protruding portions.

19. The coupling device according to claim 17,
wherein the second fixing element comprises a rotation prevention portion; and
wherein the second member has, when the first fixing element and the second fixing element are disposed in the through hole, a portion cooperating with the rotation prevention portion of the second fixing element to prevent the second fixing element from rotating due to rotation of the first fixing element.

20. The coupling device according to claim 19, wherein the first pressing portion is integrated into the first fixing element.

21. The coupling device according to claim 17, wherein when the first fixing element and the second fixing element are disposed in the through hole of the second member, the first pressing portion and the second pressing portion are selectively positioned in a first released state where the protruding portion of the first member can be inserted into the reception hole or removed from the reception hole or in a second fixed state where a fixing force is exerted on the protruding portion.

22. The coupling device according to claim 21,
wherein the first pressing portion is opposed to the second pressing portion, and
wherein a distance between the first pressing portion and the second pressing portion in the first released state is longer than a distance between the first pressing portion and the second pressing portion in the second fixed state.

23. The coupling device according to claim 21,
wherein the first pressing portion and the second pressing portion face in opposite directions, and
wherein a distance between the first pressing portion and the second pressing portion in the first released state is shorter than a distance between the first pressing portion and the second pressing portion in the second fixed state.

24. The coupling device according to claim 17,
wherein each of the first pressing portion and the second pressing portion has a tapered shape, and
wherein each of the two protruding portions has a recessed shape corresponding to the tapered shape.

25. A cutting tool comprising the coupling device according to claim 17.

26. A cutting tool according to claim 25, wherein the first member is one of a tool leading end member and a tool body, and the second member is the other of the tool leading end member and the tool body.

27. A cutting tool according to claim 26, wherein the first member directly includes a cutting edge.

28. A cutting tool according to claim 26, wherein a member with the cutting edge is removably mounted to at least one of the first member and the second member.

29. The coupling device according to claim 17, wherein each of the two reception holes is opened on a coupling face which the first member abuts, when coupling the first member and the second member.

30. The coupling device according to claim 17, wherein the through hole includes two portions in which the first pressing portion and the second pressing portion can be disposed, respectively and a center portion located between the two portions, and
the center portion of the through hole is formed such that the first pressing portion and the second pressing portion cannot enter and pass through the center portion.

* * * * *